(12) United States Patent
Mahalingaiah

(10) Patent No.: US 8,458,453 B1
(45) Date of Patent: Jun. 4, 2013

(54) METHOD AND APPARATUS FOR SECURING COMMUNICATION OVER PUBLIC NETWORK

(75) Inventor: Rupaka Mahalingaiah, Austin, TX (US)

(73) Assignee: Dunti LLC, Austin, TX (US)

( * ) Notice: Subject to any disclaimer, the term of this patent is extended or adjusted under 35 U.S.C. 154(b) by 369 days.

(21) Appl. No.: 12/356,220

(22) Filed: Jan. 20, 2009

Related U.S. Application Data

(63) Continuation-in-part of application No. 10/866,358, filed on Jun. 11, 2004, now Pat. No. 7,778,259.

(60) Provisional application No. 61/023,141, filed on Jan. 24, 2008.

(51) Int. Cl.
*H04L 29/06* (2006.01)

(52) U.S. Cl.
USPC ........... 713/153; 713/160; 726/13; 726/15

(58) Field of Classification Search
USPC ........... 713/153, 160; 726/13, 15; 709/229, 709/225
See application file for complete search history.

(56) References Cited

U.S. PATENT DOCUMENTS

| | | | |
|---|---|---|---|
| 4,507,782 A | 3/1985 | Kunimasa et al. | |
| 4,538,026 A | 8/1985 | Yasue | |
| 4,615,028 A | 9/1986 | Lewis et al. | |
| 4,679,191 A | 7/1987 | Nelson et al. | |
| 4,933,930 A | 6/1990 | Lien et al. | |
| 5,023,872 A | 6/1991 | Annamalai | |
| 5,095,480 A | 3/1992 | Fenner | |
| 5,134,610 A | 7/1992 | Shand et al. | |
| 5,175,765 A | 12/1992 | Perlman | |
| 5,319,644 A | 6/1994 | Liang | |
| 5,425,026 A | 6/1995 | Mori | |
| 5,442,708 A | 8/1995 | Adams et al. | |
| 5,444,702 A | 8/1995 | Burnett et al. | |
| 5,485,455 A | 1/1996 | Dobbins et al. | |
| 5,509,000 A | 4/1996 | Oberlander | |
| 5,524,254 A | 6/1996 | Morgan et al. | |
| 5,548,646 A | 8/1996 | Aziz et al. | |
| 5,566,193 A | 10/1996 | Cloonan | |
| 5,568,482 A | 10/1996 | Li et al. | |
| 5,596,715 A | 1/1997 | Klein et al. | |
| 5,633,869 A | 5/1997 | Burnett et al. | |
| 5,682,479 A | 10/1997 | Newhall et al. | |
| 5,721,819 A | 2/1998 | Galles et al. | |

(Continued)

FOREIGN PATENT DOCUMENTS

| | | |
|---|---|---|
| EP | 0403973 | 12/1990 |
| EP | 0751642 | 1/1997 |
| EP | 0855820 | 7/1998 |

OTHER PUBLICATIONS

Lucent Technologies, "CBQ Frequently-Asked Questions," www.xedia.com/products/cbq_faq.htm, last modified: May 26, 1999.

(Continued)

*Primary Examiner* — Eleni Shiferaw
(74) *Attorney, Agent, or Firm* — Charles D. Huston; Daffer McDaniel, LLP

(57) ABSTRACT

A system and method of providing secure communications between two or more hosts connected to a public network, where a secure virtual network (SVN) is established among the two or more hosts.

15 Claims, 14 Drawing Sheets

U.S. PATENT DOCUMENTS

| | | | |
|---|---|---|---|
| 5,757,924 | A | 5/1998 | Friedman et al. |
| 5,790,546 | A | 8/1998 | Dobbins et al. |
| 5,822,309 | A | 10/1998 | Ayanoglu et al. |
| 5,864,683 | A | 1/1999 | Boebert et al. |
| 5,884,024 | A | 3/1999 | Lim et al. |
| 5,970,232 | A | 10/1999 | Passint et al. |
| 5,999,991 | A | 12/1999 | Smith et al. |
| 6,006,090 | A | 12/1999 | Coleman et al. |
| 6,006,272 | A | 12/1999 | Aravamudan et al. |
| 6,119,171 | A | 9/2000 | Alkhatib |
| 6,122,278 | A | 9/2000 | Bell |
| 6,134,589 | A | 10/2000 | Hultgren |
| 6,154,839 | A | 11/2000 | Arrow et al. |
| 6,157,967 | A | 12/2000 | Horst et al. |
| 6,170,025 | B1 | 1/2001 | Drottar et al. |
| 6,185,680 | B1 | 2/2001 | Shimbo et al. |
| 6,226,267 | B1 | 5/2001 | Spinney et al. |
| 6,237,061 | B1 | 5/2001 | Srinivasan et al. |
| 6,260,120 | B1 | 7/2001 | Blumenau et al. |
| 6,275,492 | B1 * | 8/2001 | Zhang ............... 370/392 |
| 6,275,494 | B1 | 8/2001 | Endo et al. |
| 6,292,492 | B1 | 9/2001 | Bonomi et al. |
| 6,304,552 | B1 | 10/2001 | Chapman et al. |
| 6,307,837 | B1 | 10/2001 | Ichikawa et al. |
| 6,356,551 | B1 | 3/2002 | Egbert |
| 6,373,837 | B1 | 4/2002 | Kleyman et al. |
| 6,377,575 | B1 | 4/2002 | Mullaney et al. |
| 6,389,532 | B1 | 5/2002 | Gupta et al. |
| 6,412,007 | B1 | 6/2002 | Bui et al. |
| 6,519,703 | B1 | 2/2003 | Joyce |
| 6,643,286 | B1 | 11/2003 | Kapadia et al. |
| 6,785,728 | B1 | 8/2004 | Schneider et al. |
| 6,874,090 | B2 | 3/2005 | See et al. |
| 6,877,041 | B2 | 4/2005 | Sullivan et al. |
| 6,883,052 | B2 | 4/2005 | Dorenbeck et al. |
| 6,883,098 | B1 | 4/2005 | Roman et al. |
| 2001/0010692 | A1 | 8/2001 | Sindhu et al. |
| 2002/0010793 | A1 | 1/2002 | Noll et al. |
| 2002/0016926 | A1 * | 2/2002 | Nguyen et al. ............ 713/201 |
| 2007/0112578 | A1 * | 5/2007 | Randle et al. ............ 705/1 |

OTHER PUBLICATIONS

"Demystifying Bandwidth Management," © Lucent Technologies, Inc., pp. 1-12, Dec. 1999.

"Delivering Internet Access Quality of Service," © Lucent Technologies, Inc., pp. 1-8. Dec. 1999.

Antonio et al., "A Fast Distributed Shortest Path Algorithm for a Class of Hierarchically Structured Data Networks," © 1989 IEEE, pp. 183-192.

Tsuchiya, "Efficient Utilization of Two-Level Hierarchical Addresses," © 1992 IEEE, pp. 1016-1021.

Stevens, TCP/IP, Addison-Wesley 2000, pp. 37-45.

Porwal et al., "Traffic Analysis of MPLS and Non MPLS Network Including MPLS Signaling Protocols and Traffic Distribution in OSPF and MPLS," First International Conference on Emerging Trends in Engineering and Technology, Jul. 2008, pp. 187-192.

* cited by examiner

Hash based method

METHOD AND APPARATUS FOR SECURING COMMUNICATION OVER PUBLIC NETWORK

PRIORITY CLAIM

The present application claims priority to U.S. Provisional Application No. 61/023,141 filed Jan. 24, 2008. In addition, the present application is a continuation-in-part of prior U.S. patent application Ser. No. 10/866,358 filed Jun. 11, 2004, now U.S. Pat. No. 7,778,259.

BACKGROUND OF THE INVENTION

1. Field of the Invention

This invention relates to communication systems and associated devices and more particularly to methods of providing secure connectivity between devices across a public network (i.e., internet) by creating a virtual network between these devices that utilizes public network devices and methods.

2. Description of the Related Art

A communication system generally includes multiple communication devices interconnected to each other in such a way that each device may be able to establish a communication path with another device within the communication system. The interconnection between devices may take the form of an interconnected set of sub-networks or subnets. A network can be made up of localized subnets, or can be extended to include multiple subnets to form an intranet. Further, multiple intranets can be extended to form an internet.

Devices within a network communicate with one another using packet-based protocols such as Internet Protocol (IP) and Transmission Control Protocol (TCP). Data to be transmitted over the network using TCP/IP is broken up into a number of packets, which are transferred over the network along with embedded address and control information within each IP packet. These IP packets are separately sent across the network, possibly using different network paths, and are then re-assembled at a receiving device.

To ensure the reliability of the packet transmission, each layer of the popular Open System Interconnect (OSI) stack is responsible for a different aspect of transmission. The lower layers maintain the physical connection between devices while low-level protocols such as Ethernet provide a method for sharing the communication medium as well as encapsulating higher-layer packets such as IP.

The IP protocol provides a method for routing packets within and between intranets, and across logically separated network segments. It also includes methods for CRC error checking and fragmenting data into smaller frames depending on the maximum transmission unit (MTU) of the system. The Internet Protocol Version 4 (IPv4) specification provides for a 32-bit address field for packet source and destination, while the newer IPv6 specification expands this to 128 bits. The IP packet itself may encapsulate higher-layer communication protocols, such TCP, which can handle more advanced packet transmission functions such as out-of-order packet handling, communication timeouts and packet re-transmission.

A host is any device which can send and receive data and, as used herein, is generally found at the end nodes within a communications system. Each host will generally be capable of communicating using one or more of the protocols that are supported by the communication system, such as TCP/IP. Typical hosts include devices such as personal computers, printers and servers. Some devices, such as personal computers, have the ability to support more than one interface to a communications system. One example is a the use of multiple host network adapters within the same personal computer. In such a case, each interface can be considered a separate host within the communication system.

The communication between hosts within a network typically requires additional devices such as network switches and routers. A network switch allows more than one host to be connected to the same subnet, and allows those hosts to communicate with one another. A network switch will only allow for communication between devices that are members of the same subnet. A typical network switch will ignore TCP/IP information within each packet, and will only use lower-layer information to determine where to send each packet. In the case of TCP/IP over Ethernet, the Ethernet header will be used instead of the IP header to determine the packet source and destination. Each Ethernet interface that a host uses has a unique 48-bit Ethernet address. The Ethernet header contains both the source and destination Ethernet address, which are then used by the network switch to determine the packet destination.

A network router typically provides all of the functionality of a network switch, but additionally uses the information contained within the IP portion of the packet to allow hosts in different subnets to communicate with one another. An intranet, for example, may consist of multiple subnets, each with hosts that may need to communicate with hosts on other subnets. An intranet may also be connected to an internet using a network router. This would allow hosts within the intranet to communicate with hosts that are outside of their intranet.

The IP destination address is checked through the use of a lookup table within the router to determine if the destination for the packet is within the same subnet, or if the packet needs to be sent to a different subnet. If the router is connected to an internet, it can also use the IP destination address to determine if a packet should be routed between the internet and one of the subnets connected to the router.

In a distributed network environment such as an enterprise network, several intranets may be linked together through a public network such as the Internet. In many cases, the intranets are partitioned into smaller subnets to improve manageability and security. The subnets themselves may be logically partitioned further using virtual local area networks (VLANs). Network devices with VLAN functionality use IP address, Ethernet address and port number information to logically group network hosts together. This grouping can occur between hosts that are on different subnets, or even between hosts that are members of different intranets connected through an internet.

Although VLANs can be used to partition a network, they do little to provide network security. To secure the communications between hosts, a combination of security methods are used, including firewalls and virtual private networks (VPN).

Firewalls provide an intermediate stage where traffic to and from each switch or router can be monitored, translated and filtered as required. They are typically deployed at the entry/exit point of a network segment to filter access to and from the network segment. The problem with securing communication with firewalls is that they are designed to operate at a single point in the communication path. They do not monitor the complete communication path as a whole. This limited visibility prevents firewalls from being able to fully protect the entire communication path. In addition, they are difficult to configure because each firewall in the communication path must be updated and configured separately as security and accessibility needs change. Firewalls are also capable of disrupting or blocking higher-level communication protocols that are required for certain network services to function, and must be upgraded or modified to be compatible with these functions.

VPN provides a method of securing communication between hosts by encrypting communication between them. VPNs are typically deployed across a public internet to connect hosts together, and can also provide a method for securely connecting subnets together to form a secure intranet across a public internet. The VPN connection that is created across the public internet is called a VPN tunnel. One of the advantages of using VPN instead of a dedicated network is the reduced cost associated with using a public internet.

There are several ways of implementing VPN security. One method is to use Internet Protocol Security (IPsec) in tunnel mode, which encrypts IP packets and then encapsulates them in an additional IP header before sending them through a VPN tunnel. Authentication with IPsec typically uses IPsec internet key exchange (IKE) negotiation, which requires all hosts to authenticate before using the VPN tunnel. Although IPsec provides per-packet authentication, one disadvantage of most VPN implementations using IPsec is that authentication is based on the host using the VPN, rather than the user of the VPN connection. This would allow any user with access to the host to use the VPN. If IKE is not used, IPsec must assume that the VPN connection was authenticated before the VPN tunnel was created, which can be a large security loophole. Another limitation of IPsec is that it can't negotiate security for multicast or broadcast traffic, including Address Resolution Protocol (ARP) and Reverse Address Resolution Protocol (RARP). IPsec also has compatibility problems with peer-to-peer and real-time applications, as well as applications which use Internet Control Message Protocol (ICMP). Another disadvantage of IPsec is that the IPsec tunnel mode used in VPN applications does not support dynamic address assignment. Further, IPsec tunnel mode policies are not optimized for mobile clients with dynamic IP addresses.

Other methods of implementing VPN include the use of Point-to-Point Tunneling Protocol (PPTP) or Layer Two Tunneling Protocol (L2TP). Both of these methods operate at the layer two data-link layer of the OSI stack, instead of layer three which IPsec uses. The advantage to using either of these two VPN implementations is that they both support IP, as well as IPX or NetBEUI traffic, while IPsec only supports IP. Another advantage is that PPTP and L2TP both support dynamic address assignment of hosts using the VPN. The L2TP is an open IETF standard, while PPTP is a proprietary implementation developed by Microsoft™, and so interoperability with non-Microsoft platforms can be difficult. Both PPTP and L2TP implementations encapsulate layer two Point-to-Point Protocol (PPP) datagrams and therefore inherit methods that are used by PPP, such as Extensible Authentication Protocol (EAP), which allows for "plug-in" modules to support new authentication schemes as they become available. One common EAP module is EAP Transport Layer Security (EAP-TLS), which uses public key certificates to provide user-level authentication.

An L2TP VPN implementation alone does not use cryptography to secure the VPN tunnel, and so L2TP must be combined with a protocol such as IPsec to provide a secure VPN connection. One method is to use the IPsec encapsulating security payload (ESP) to create a L2TP/IPsec VPN connection. The combination of L2TP and IPsec has been standardized as RFC3193. The combination of these two standards for VPN tunneling can be complex to maintain, and more seriously can be problematic with intermediate routing equipment, which may be inaccessible to those maintaining the VPN.

Another disadvantage to using L2TP/IPsec in a VPN implementation is that it is incompatible with network address translation (NAT) devices. These devices will not work with the Ipsec protocol unless Ipsec NAT Traversal (NAT-T) is used to encapsulate the Ipsec packet with a UDP or TCP header. The disadvantage to using NAT-T is that it may be implemented in different ways.

A PPTP VPN implementation also encapsulates PPP datagrams, but uses a TCP connection for VPN tunnel maintenance and uses generic routing encapsulation (GRE) to encapsulate PPP datagrams. This can be a serious problem with some routers, which block the GRE protocol. The PPP payload can be encrypted and/or compressed. Although PPTP provides per-packet data encryption, it does not provide per-packet data authentication, which IPsec provides. Another disadvantage of PPTP is that it does not provide per-packet data authentication, and so it cannot guarantee that a given packet was sent by the authorized user. It also cannot guarantee data integrity to assure that a packet was not modified in transit. Further, it only provides user level authentication, and does not provide authentication of the host itself.

Another VPN solution is to use an open standard called OpenVPN, which encapsulates IP/Ethernet packets and encrypts them using OpenSSL. As a security protocol, OpenSSL uses RSA public key cryptography, and is handled by the hosts at the application layer of the OSI stack. Although RSA public key cryptography is a robust form of security, it requires a high level of processing overhead resulting in increased latency for communications. Another factor affecting the performance of OpenVPN is that it has a high level of overhead in handling each packet. The IP/Ethernet packets are encapsulated in SSL and the SSL is further encapsulated in UDP/TCP.

As an alternative to using VPNs across a public network, a dedicated secure network (DSN) may be used. A DSN uses link-layer or physical-layer encryption devices to establish a secure network across a public network. The benefit of a DSN is that it has a lower impact on network performance than a VPN solution. However, DSNs are expensive to implement and maintain, and are not flexible enough for most deployments. They are also typically difficult to upgrade as new network or security capabilities are required.

The implementation of a secure enterprise network will often consist of a complex combination of network security methods that are used to secure both private subnets and connections between subnets, which traverse the Internet. In the case of a network such as that used in the financial industry, customers and remote ATM machines must be able to have a secure way to access account information across the Internet. Branch offices that can't use a DSN may need to use a VPN tunnel to connect their subnet(s) to a central office that performs their core-processing functions. Firewalls must be installed at the boundary and also within network segments for security, but these firewalls must be upgraded regularly as network policies change and as security loopholes are discovered. Further, there are often difficulties associated with making firewalls compatible with network security methods, or even with the communication itself. These compatibility problems often lead to security loopholes.

It would be desirable to have a method of creating a distributed secure virtual network of hosts that would be configurable so that individual hosts or groups of hosts could securely communicate across a public network using existing protocols such as IP, IPX, etc. The devices in this distributed secure virtual network should be configurable as to not to communicate with other terminating devices in the public network. Optionally, they should also be capable of communicating with other devices using a public protocol, but still communicate with the secure virtual network devices in a secure manner.

The distributed secure virtual network should be backward compatible with existing network devices, firewalls, NAT translation methods, and existing VPN solutions. When used as an alternative to VPN, it should provide a complete, stand-alone solution that is simple and inexpensive to install and administrate while providing advanced capabilities such as support for mobile and wireless hosts, secure ARP and RARP broadcasts, and secure dynamic address assignment of hosts.

Communication within the distributed secure virtual network should be secured and authenticated, with both host and user authentication. The security method used should be immune to decryption techniques and password attacks, and should dynamically change. Further, each secure virtual network should use a preventive form of security, which inherently provides security within its architecture, and therefore should not require upgrades to patch security problems over time.

The following patents are cited for background information only and are incorporated herein by reference: U.S. Pat. No. 6,154,839; U.S. Pat. No. 6,519,703; U.S. Pat. No. 6,883, 098; U.S. Pat. No. 6,883,052; U.S. Pat. No. 6,877,041; U.S. Pat. No. 6,874,090; U.S. Pat. No. 6,785,728; U.S. Pat. No. 6,154,839; U.S. Pat. No. 6,519,703.

SUMMARY OF THE INVENTION

The problems outlined above are in large part solved by an innovative packet level security mechanism that provides security verification and filtering at packet level. This mechanism also enables hosts that are connected across a public network to be connected to form secure virtual networks (SVN). An SVN may be established as a peer-to-peer connection between two hosts, as a connection between a host and a subnet, or as a connection between two or more subnets consisting of multiple hosts. The packet based security method will allow for the creation of SVN by modifying the contents of all or some of the packets in such a way that only the destined host that is part of the same SVN will be able to restore the contents of the packet when it is received.

Hosts that are part of an SVN will utilize the common communication protocol used by other network devices connected on the network. Additional hosts may be present within the network that also share the same communication protocol, but are not to be part of the same SVN. Regardless of the location of all hosts within the network, the hosts that are part of a SVN will be able to communicate within the constraints of the chosen protocol, yet provide a secure virtual network environment. While the hosts and other network devices that are not part of the SVN may transmit packets belonging to an SVN, they will not be able to access the payload of the packet, and will not be able to modify the packet contents and pass it as original packets.

According to one embodiment, a communication system is provided. A communication system comprises a network of interconnected sub-networks or subnets. Connected to the network are two or more individual hosts or subnets that need to communicate securely with each other over the network. The network consists of multiple intermediate network interconnect elements which allow the hosts to communicate. As defined herein, an interconnect element is a generic term which describes a network device which receives packets and then forwards them to hosts or other network devices in the network, and which may have the capability of dropping them. Each of these interconnect elements may have additional connections to hosts or other interconnect elements within the network. The interconnect elements or hosts that come in contact with the packet once it leaves the sending host may be considered as the public network. If the sending host belongs to a subnet that is shared with other hosts within that subnet, then once a packet leaves that subnet, that packet can be considered to have entered the public network.

A method is provided to allow secure communication across the public network between individual hosts, or between subnets consisting of multiple hosts. Each host or group of hosts that wish to communicate securely with another host or group of hosts across a public network may use a secure method of communication that is common between these hosts. When this secure communication takes place across the public network, each host can be considered to be part of a secure network that uses the resources of the public network, yet are able to communicate securely. In this sense, the secure communication creates a virtual network, which uses the resources of the public network to allow secure communication between hosts. Each of these virtual networks that provides secure communications between hosts or groups of hosts will hereafter be referred to as a SVN. Any number of SVNs may be created within the same public network and assuring that the communication that takes place between hosts within a given SVN cannot be processed or understood by a host belonging to other SVN or any host within the public network.

In one embodiment, an SVN is setup by assigning unique identifiers known as SVN identifier (SVN ID) to each host within the system. In one embodiment this SVN ID may be used to partition the SVN system into sub-groups. In another embodiment, the SVN ID may reflect the geographical or logical location of a host within the SVN. In yet another embodiment, SVN ID may reflect a hierarchical architecture of the hosts with the SVN system built on security, logical, or other such parameters.

Each host that is connected to an SVN will hereafter be referred to as an SVN host. Each SVN host will have a connection to at least one other SVN host with an SVN. An SVN may designate one or more SVN hosts as master node that may be used to setup, control, and monitor the operation of a SVN. This master node will be hereafter referred to as an SVN master. An SVN may have more than one SVN master. In one embodiment with multiple SVN masters, each may be assigned designations such as the primary SVN master, secondary SVN master, and so on. In another embodiment, an SVN may have no SVN host specifically designated as the master. In this case, any SVN host can negotiate to be a master for a brief period of time to perform a given operation. In this embodiment, the SVN master is said to "roam."

Within a SVN, communication between SVN hosts maybe controlled by setting up permanent or temporary communications channels known as SVN channels (SVNC). The SVN master will provide the methods required to dynamically create SYNC amongst hosts or groups of hosts, maintain SYNC, destroy SYNC, and verify the identity of each SVN host. When an SVN host wishes to communicate with another SVN host or group of SVN hosts using a new SVNC, it will issue a request to the SVN master, which will then grant or deny SVNC. The decision to grant or deny SVNC can be based on a configurable table containing information about which SVN hosts are allowed to communicate with other SVN hosts, and can further include information about when these SVN hosts are allowed to communicate. If the SVN master grants communication to take place between the requesting SVN host and an SVN host or group of SVN hosts that already belong to the same SVN, then the requesting SVN host may become a part of that SVNC or a new SVNC maybe created. If there is not an existing SVN, then the SVN master will create a new SVNC between the requesting SVN host and the SVN host or group of SVN hosts it wishes to connect.

When an SVN host is allowed to communicate with other SVN hosts in a system, it is said to be part of the SVN system and a communication is a SVN session. An SVN session can be a timed event, where in a connection is permitted for a predefined period of time. In an SVN session, an SVN host can communicate with its permitted SVN hosts until the SVN master disconnects the connection or the SVN host is brought offline. An offline event can be defined in a particular embodiment as when an SVN host runs a disconnect procedure, when it is powered off, or when the timed SVN session terminates.

In one embodiment, a packet of information is to be sent securely from one SVN host to one or more SVN hosts that are part of the same SVN. The packet consists of one or more common protocols that are shared between SVN hosts. Each protocol consists of information that allows the packet to transit through the network to reach each destination SVN host. One protocol may encapsulate another protocol, such that the payload portion of one protocol can contain another protocol. Each device that receives or forwards the packet can utilize or ignore certain information within any of these protocols as required to make a decision about what to do with the packet. A secure virtual network message (SVNM) is inserted into the payload portion of a selected protocol that does not contain another protocol that is used by intermediate interconnect elements to route the packet. The contents of the SVNM may include the SVN ID, security level, and other information that will be processed by any SVN hosts receiving the packet. In addition, the contents of the SVNM may contain the values that are related to the packet transmission such as the checksum value.

A packet containing an SVNM will be referred to hereafter as a secure virtual network packet (SVNP). The starting location of the SVNM will be at an offset from the beginning of the data portion of the protocol selected. In one embodiment, SVNM can be split across the data packet in two or more locations wherein each piece of SVNM is called SVNM part. The receiving SVNM host will assemble each part resulting in the SVNM.

The length and starting location, offset, and parts of SVNM are referred to as the SVNM parameter. In one embodiment, to enhance the security, SVNM parameters may be varied periodically. In one embodiment, the variation can be initiated by SVN master sending a message to all systems to switch to a deterministic SVNM parameter. In another embodiment, each SVN host may switch the parameters based on set values. In yet another embodiment, the SVNM parameter may be varied triggered by deterministic events such as an interrupt, time of the day, or number of packets transmitted.

An SVNP is sent from one SVN host with the SVNM inserted into the payload portion of the selected protocol. The SVNP may pass through one or more intermediate network devices before reaching a destination host. Some of these intermediate devices maybe SVN hosts and while others might not be. The intermediate devices process the packet by operating on the encapsulated industry standard protocols without being aware that the packet is a SVNP. The SVNM inserted into the packet by the sending SVN host will be transparent to each intermediate network device, and will not affect the routing of the packet. Each intermediate network device will perceive the SVNM as part of the payload data, and as hence not operate on it. If a intermediate node tries to decode this packet, it will not be aware of the SVNM presence making the packets appear scrambled. Therefore, the portion of the packet beginning at the point where the SVNM begins and all of the contents of the packet thereafter will not be able to be decoded by any one of the intermediate network devices, or any host connected to one of those devices that is not a member of the same SVN and the destined SVN host. The contents of this portion of the packet will also be unreadable prior to being decoded by the hosts receiving the SVN packet due to the bit offsets used for the SVNM starting and ending locations.

Packets will reach their intended destination using one or more protocols shared by the sending and receiving SVN host. The SVNM that was inserted into the packet must be extracted to obtain the original SVNM message instructions that may have been added to the packet, and to restore the contents of the payload data portion of the packet where the SVNM was inserted. Several methods are provided to extract the SVNM that was inserted into the packet by the transmitting SVN host, and to restore the remainder of the packet to its original form and contents.

According to one embodiment, a static security method is provided for determining the starting location and the length of the SVNM that will be inserted into packets by the sending SVN host, and extracted by a receiving SVN host. When an SVN host becomes a member of an SVN, the SVN master sends a message to the SVN host that contains a SVN enabler (SVNE) which maybe a numeric value, graphic picture, table etc unique to that SVN. Each SVN host within a SVN will be given SVNE. SVNE may be used by the SVN host in generating SVNM to be embedded into the packets. Receiving SVN host can use the SVNE to extract the packet data. In one embodiment, the SVNE can be constant over the entire SVN with each SVN host having the same SVNE. In another embodiment, each SVN host can have a different SVNE and every other SVN host authorized to communicate with this SVN host will have the corresponding SVNE in an allowed SVNE table. It will use this allowed SVNE table to verify the other SVN hosts for secure communication. The master SVN host will be responsible for managing the allowed SVNE table for each SVN host in a master-based SVN system.

According to another embodiment, a parameter-based security method is provided for determining the starting location and the length of the SVNM that will be inserted into packets by the sending SVN host, and extracted by a receiving SVN host. The sending SVN host may use a parameter that is unique to that host such as the Ethernet or IP address, and pass this parameter to a function that will create a hash of the original parameter. This hash is then used to determine the starting location and length of the SVNM. The parameter that is chosen, and the function that is used should both be available to the receiving SVN host so that the SVNM can be extracted. A default function could be used in each SVN host, and the SVN master may distribute new functions to SVN hosts periodically. The SVN master could also distribute one or more additional parameters for SVN hosts to combine with their own parameters. These distributed parameters could consist of a hash of unique information from each SVN host, such as a hash of the combination of the passwords obtained from both SVN hosts.

According to another embodiment, an on-demand, time-based method is provided for determining the starting location and the length of the SVNM that will be inserted into packets by the sending SVN host, and extracted by a receiving SVN host. When an SVN host becomes a member of an SVN, the SVN master sends a message to the SVN host asking it to synchronize its clock with the SVN master clock. The message from the SVN master also provides a random seed number and the time interval at which the SVN host must generate the next random number based on the seed provided. The SVN master will send the same seed value and time intervals to each SVN host within the same SVN, and also synchronize each of their clocks. The random number that is generated will be used to determine the starting bit location and the length of the SVNM that will be inserted into outgoing SVNPs.

The receiving SVN host will analyze incoming SVNPs and use the synchronized random number to determine the bit location and length of the SVNM so that it can be extracted from the SVNP. If the SVNM is not extracted properly, the SVN host can attempt to use the previous or next generated random number to decode the SVNP.

According to another embodiment, an on-demand, counter-based method is provided for determining the starting location and the length of the SVNM that will be inserted into packets by the sending SVN host, and extracted by a receiving SVN host. Each SVN host maintains a count of the number of packets it has transmitted to each individual SVN host with which it communicates, as well as the number of packets it has received from each individual SVN host with which it communicates.

When an initiating SVN host wishes to communicate with a target SVN host, it establishes a transmit counter and receive counter to keep track of packets transmitted to and received from the target SVN host. It then issues a request to the SVN master to communicate with the target SVN host. The SVN master will then request the target SVN host to establish a transmit counter and receive counter to keep track of packets transmitted to and received from the initiating SVN host. The SVN master also provides a random seed number and a maximum packet count value that is to be used by both SV hosts to determine when to reset the counter and generate the next random number based on the seed provided. The SVN master will send the same seed value to each SVN host within the same SVN. Once all SVN hosts have been initialized, the SVN master sends a message to the initiating SVN host to begin communication.

Any time the transmit count from SVN host to another reaches the maximum packet count, the transmitting SVN host generates the next random number and uses this to encode the SVNPs that it transmits. In a similar manner, any time the receive count reaches the maximum packet count, the receiving SVN host generates the next random number and uses this to decode the SVNPs that it receives. If the SVNM is not extracted properly, the SVN host can attempt to use the previous or next generated random number to decode the SVNP.

According to another embodiment, a static hash table method is provided for determining the starting location and the length of the SVNM that will be inserted into packets by the sending host, and extracted by a receiving host. A hash table will be used as a basis for choosing the starting offset position for the SVNM within the payload portion of the selected protocol, as well as the length of the SVNM. The hash table will also be used to determine an amount of random data to be inserted between the beginning of the SVNM and the beginning of the actual SVNM data. The hash table itself may take the form of any type of data, including a graphical image. When an SVN host becomes a member of an SVN, the SVN master sends a message to the SVN host, which contains an index into the hash table. Starting at this index into the hash table, the SVN host will use the data contents of the table to choose the starting offset and length of the SVNM for either sending or receiving SVNPs. All SVN hosts within the same SVN will be issued the same index number, and the SVN master may periodically provide a new index, a new hash table, or instructions on which hash table to use if multiple hash tables are available.

The static hash table method may be combined with a parameter-based security method such that the data starting at the index into the selected hash table can be combined with a parameter that is unique to the sending host such as the Ethernet or IP address, or a parameter that is distributed by the SVN master. A parameter distributed by the SVN master could be a hash of unique information from both SVN hosts, such as a hash of the combination of the passwords obtained from both SVN hosts.

According to another embodiment, a static hash table method may be combined with an on-demand time-based or counter-based method, such that the hash table that is selected, and the index into that table, are changed at periodic intervals using a time-based method or after a specified packet count using a counter-based method.

Any portion of the original packet that was modified during the insertion of the SVNM can be restored, such as packet checksum or CRC values. These values can be part of the SVNM itself, to reduce packet-processing time by the receiving host. Once the packet is fully restored, it is passed to higher layers of the OSI stack, which normally process the packet.

Within a communications system, a host on the network often must locate the address of another host on the network. Based on the selected protocol that is common between the two hosts, the first host will send a broadcast packet onto the network. In the case of IP over Ethernet, the Address Resolution Protocol (ARP) may be used to broadcast a packet onto the network to request the owner of a particular IP address to respond with its Ethernet address. Alternatively, the Reverse Address Resolution Protocol (RARP) may be used to request the owner of a particular MAC address to respond with its IP address. Packets that are to be broadcast onto the network will have their destination address set to a predefined broadcast address, which is to be accepted by all devices or software that process the selected protocol. In the case of IP over Ethernet, an ARP request broadcast will set the 48-bit Ethernet destination address field such that each bit is a 1. In addition, the packet type field in the Ethernet header is modified to indicate an ARP or RARP request. The remainder of the ARP or RARP request includes the senders Ethernet and IP address, so that the host that responds to the ARP or RARP request can reply with a message containing its IP and Ethernet address. This information is then added to a table in both the requesting host and the replying host. This table contains IP to Ethernet address mapping information, and the entries in the table are periodically removed.

According to another embodiment, a method for network address resolution can be provided that provides the same functionality as the ARP and RARP protocols, but which provides the ability for the payload of the packet to be secured. The SVN master will have a statically defined Ethernet address and IP address that is known by each SVN host, and will maintain an address resolution table of Ethernet to IP address mapping for each SVN that the SVN master has created. When an SVN host first joins an SVN, it can send a message to the SVN master requesting an entire table of Ethernet to IP address mapping for all SVN hosts within the same SVN. Any time that the host needs to resolve an Ethernet or IP address for an SVN host within its SVN, it can send a message to the SVN master requesting the individual Ethernet to IP address mapping. All messages to and from the SVN master use SVNPs to provide security. Using this method, standard ARP and RARP requests will not need to occur, and can even be suppressed by each SVN host.

To provide secure transmission for ARP requests, intermediate interconnect elements and hosts that receive the broadcast should not be able to decode the contents of the ARP request. The Ethernet address and IP address of the host sending the ARP request should be secured so that they are not visible to intermediate interconnect elements and hosts. Further, intermediate interconnect elements and hosts must be able to process the ARP request as though it were a normal ARP request. Securing the ARP request requires that the Ethernet header contains a 48-bit destination Ethernet address with each bit set to 1, as well as a valid Ethernet source address. The Ethernet source address field is normally the Ethernet address of the host sending the ARP request, but can be changed to a value that is a reserved address from InterNIC that can be the same for all hosts within the SVN.

According to another embodiment, a method is provided to allow secure dynamic address assignment to SVN hosts using standard dynamic address assignment techniques. When an SVN host first becomes a member of an SVN, it will need to have a network address assigned to it. Within an IP network, Dynamic Host Configuration Protocol (DHCP) is one method of distributing IP addresses to hosts within the network. When DHCP is used, one device within the network is a DHCP server, and is responsible for using the DHCP protocol to distribute and revoke IP addresses. The DHCP protocol uses the same message format as the Bootstrap Protocol (BOOTP), which has messages that are encapsulated within a UDP packet, which are encapsulated within an IP packet. The messages that BOOTP/DHCP uses are not secure, and so these protocols are often exploited in network attacks. Since the BOOTP/DHCP protocols are transported within an IP packet, they can be transported within an SVNP to provide security. Intermediate devices or hosts will not be able to decode the information contained within the BOOTP/DHCP message, and will not be able to distinguish between a BOOTP/DHCP message and any other IP packet.

According to another embodiment, a method is provided to authenticate an SVN host that requests to communicate with another SVN host or group of SVN hosts. In addition to securing the communication between SVN hosts by creating secure SVNs, each SVN host must be authenticated in such a way that the user of the SVN, as well as the device being used to connect to the SVN, are considered valid. Further, the entity performing the validation should verify that only one SVN host is authenticated with the same user and device information at any given time.

Each SVN host will have an IP address, a unique Ethernet address, and a unique SVN host ID. The user of the SVN host will also have a username and password, and possibly an identification certificate provided by an external device such as a security card. The SVN master will have a local table containing the Ethernet address, IP address, Username, Password, SVN host ID, and other information such as the identification certificate of the user, if required.

When an SVN host is first connected to the public network, it will not be allowed to communicate with any other SVN host. The SVN host must first indicate to the SVN master that it is present on the public network. The SVN master will then request an authentication attempt by the SVN host. The SVN host will ask the user to enter a username and password, and to provide the identification certificate of the user if required. This information will become part of an SVNM, which will be sent as an SVNP to the SVN master. The SVN master will decode the SVNP and extract the SVNM and then verify that all of the information received is correct, and that only one SVN host is authenticated with the same user and device information. If the authentication is successful, then the SVN host is considered an authenticated SVN host. The SVN master may request any SVN host to re-authenticate as needed.

BRIEF DESCRIPTION OF THE DRAWINGS

Other objects and advantages of the invention will become apparent upon reading the following detailed description and upon reference to the accompanying drawings in which.

DETAILED DESCRIPTION OF PREFERRED EMBODIMENTS

Figure 1:
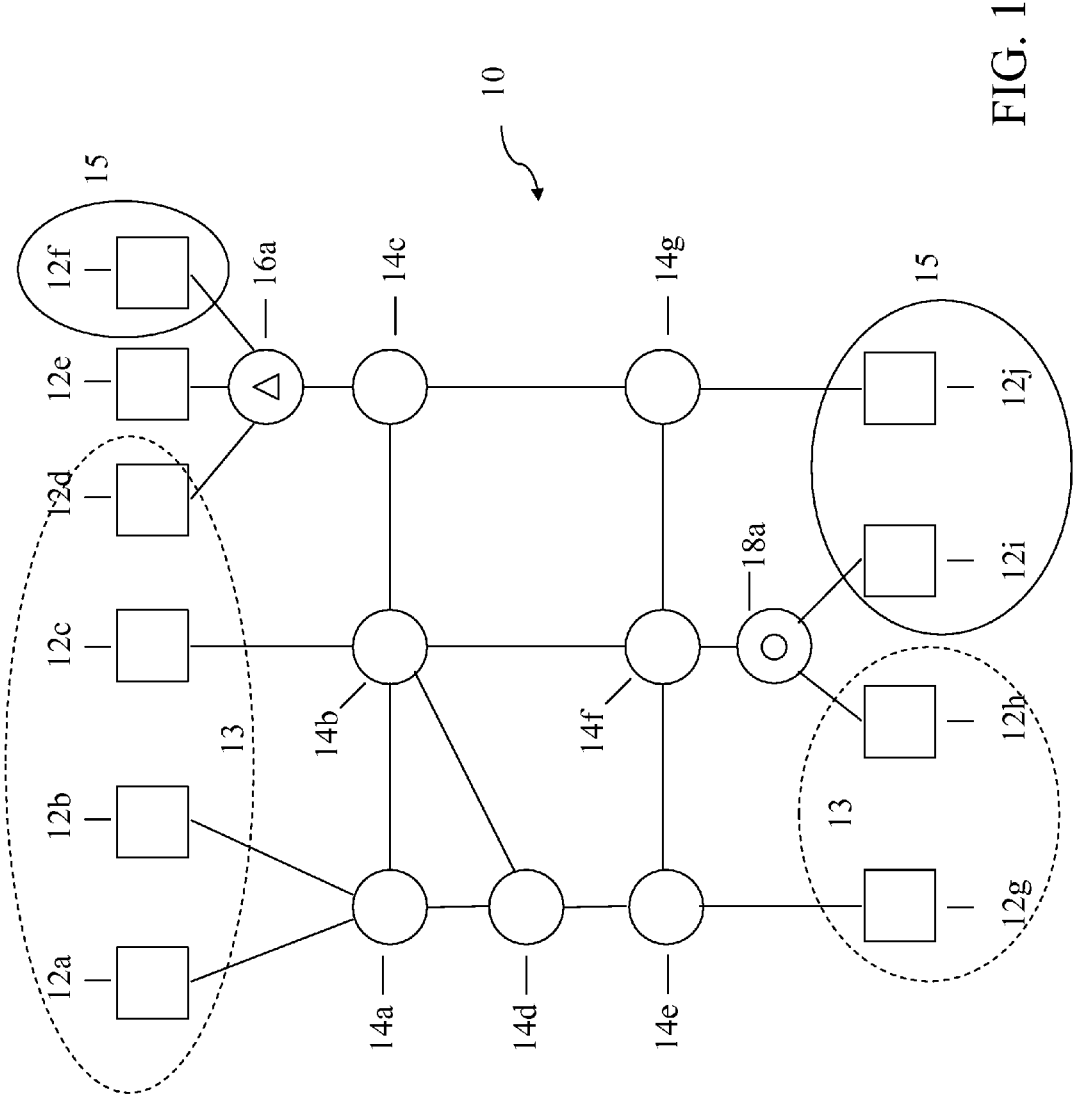
FIG. 1 is a diagram of a communications system consisting of multiple hosts and multiple interconnect elements.

Turning now to the drawings, FIG. 1 illustrates a communications system 10 that comprises of many hosts. The communication system may be a public network such as the Internet. It should be noted that this is a sample system that could encompass any network communication system, wired or wireless. Communication system 10 consists of a network of hosts 12 and interconnect elements 14. Each host 12 may in turn represent a communication system in itself. Each interconnect element may comprise of a system of communication system interconnects.

Interconnect elements 14 connect with one another enabling communication amongst hosts 12. FIG. 1 depicts a filter 16, which provides the capability of filtering traffic. An example of filter 16 maybe a firewall that filters traffic based on IP address or TCP port. A network address translation (NAT) device 18 maps the IP address of each host 12 connected to it to one or more IP addresses that are used to connect to the public Internet. Each interconnect element 14 may connect to one or more interconnect elements, and may connect to one or more hosts 12.

FIG. 1 shows some hosts such as host 12c, 12g, and 12j connecting independently to the communication system, while hosts 12a, 12b form a subnet connecting to interconnect element 14a. Hosts 12d, 12e, and 12f form a subnet connecting to interconnect element 14c via filter 16a. Hosts 12h and 12i are part of a subnet and connect to interconnect element 14f via NAT 18a.

FIG. 1 shows some of hosts being setup as SVN to achieve secure transmission between certain hosts. Within this communication system, two SVNs (SVN 13 and SVN 15) are defined. SVN 13 (shown in dashed lines) comprises of hosts 12a, 12b, 12c, 12d, 12g, and 12h. Host 12c is designated as the SVN master for SVN 13. SVN 15 comprises of hosts 12f, 12i, and 12j. It should be noted that host 12e is not part of any SVN.

As illustrated, hosts belonging to various subnets may be connected to form secure private networks with SVNs.

Figure 2:
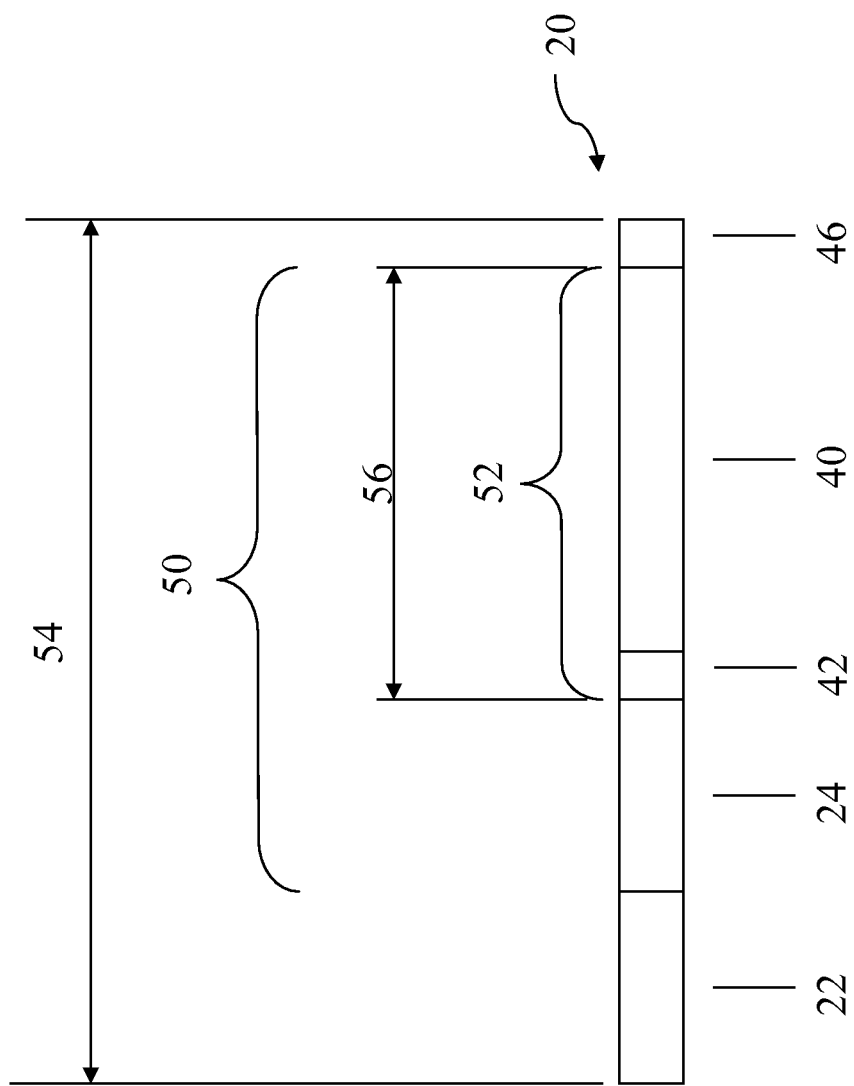
FIG. 2 is a diagram of a network packet, such as an IP packet, encapsulated within an higher layer packet, such as MAC Ethernet packet.

FIG. 2 illustrates a packet in traditional networking system. Packet 20 contains data payload encapsulated by various layer header and trailers. In a traditional TCP/IP/Ethernet network, Ethernet packet 20 will contain an IP packet 50 and an Ethernet CRC checksum 46. The IP packet 50 consists of an IP header 24 and IP payload 52. The IP payload 52 may consist of another protocol, such as TCP or UDP, which will consist of transport layer header 42, and transport payload 40. It should be noted that although the following description uses Ethernet/TCP/IP protocol suite to illustrate the functioning of SVN, it can be used to for any protocol.

Figure 3:
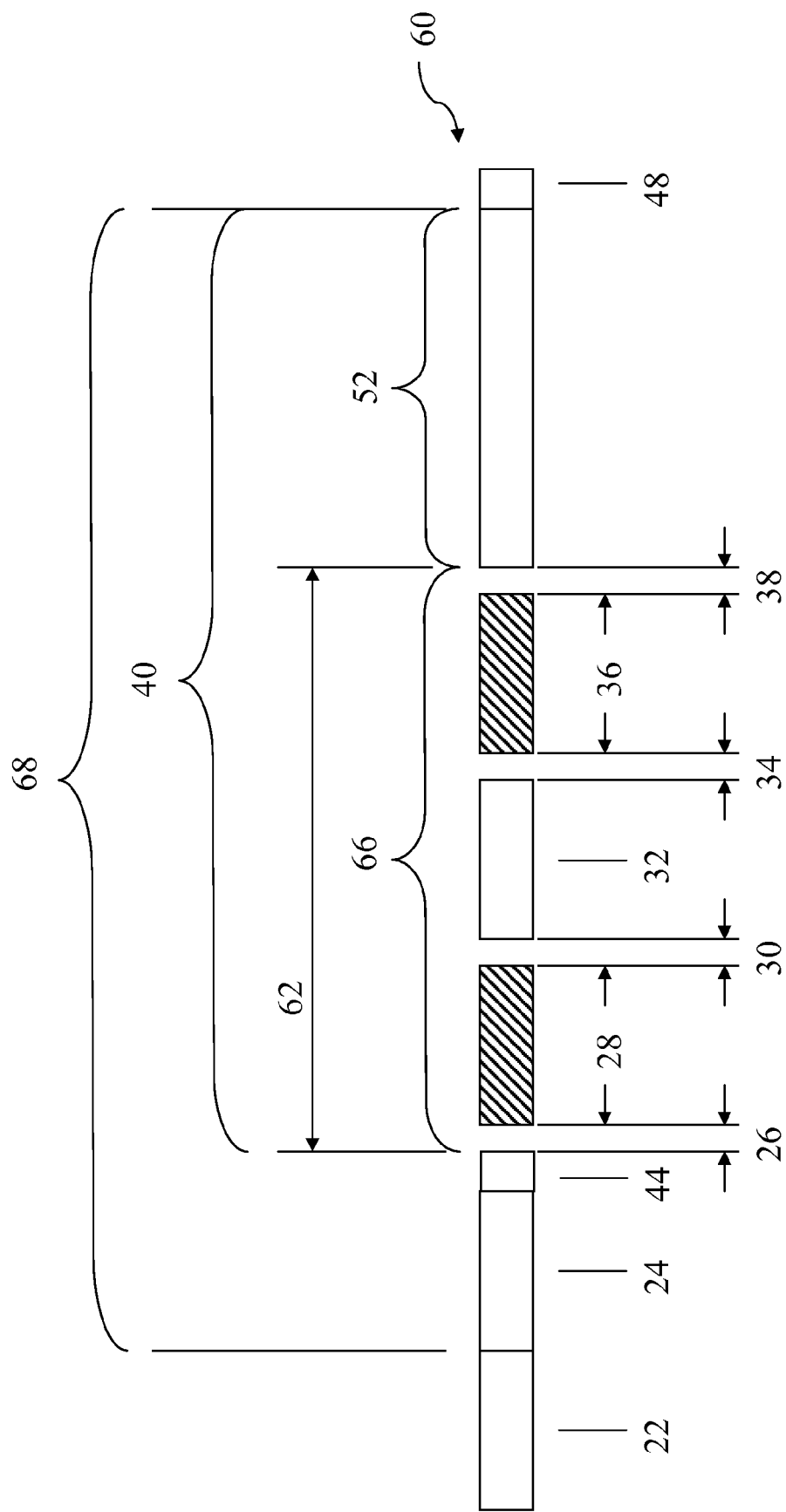
FIG. 3 is a diagram showing the insertion of the SVNM into the packet payload, resulting in an SVNP.

Turning now to FIG. 3, an Ethernet packet 20 is modified by inserting encoded secure virtual network message 66 (ESVNM) into the transport payload 40 to create Ethernet secure virtual network packet 60 (ESVNP), which is used for secure communication between SVN hosts. The ESVNP 60 is created by modifying the transport payload 40 of IP packet 50 with a variable length offset 28, a fixed length SVNM 32, and variable length offset 36. The maximum length 62 for ESVNM 66 will be defined for each SVN. The variable length offset 28 contains random data and will use a bit-based offset 26 from the end of the IP header 24; it will also use a bit-based offset 30 to the beginning of the SVNM 32. The variable offset 36 contains random data and will use a bit-based offset 34 from the end of SVNM 32; it will also use a bit-based offset 38 to the start of IP payload 52. The variable length offset 28, the variable length offset 36, and bit-based offsets 26, 30, 34, and 38 are all independently variable and will be based on a secure method to determine their bit offset values. Ethernet CRC 48 is appended by a data link layer device such as a media access controller (MAC) after the ESVNM 66 is added to the packet, and if present during packet receive, the MAC will remove it.

After the ESVNM 66 is inserted into Ethernet packet 20, the packet becomes an ESVNP 60. The TCP or UDP data checksum within transport layer header 42 needs to be re-calculated to account for the additional data in ESVNM 66 and re-inserted as modified transport layer header 44. The starting location of the IP payload 52 will only be known by hosts that know the length and starting and ending bit locations of ESVNM 66. Further, the starting and ending locations of SVNM 32 will only be known by hosts that know the variable length offsets 28 and 36, and the bit offset values 26, 30, 34, and 38.

Each SVN host 12 may have an upper limit to the number of bytes that the Ethernet packet 20 can carry. This parameter is commonly referred to as a Maximum Transmission Unit (MTU). If a packet that is to be transmitted exceeds the MTU value within that SVN host 12, the IP layer of the OSI stack will generate additional packets as required to account for the data that exceeds the MTU. Each of these additional packets will contain an Ethernet header 22, an IP header 24, and the remaining portion of the packet will continue where the previous packet ended. This process of creating additional packets is called fragmentation.

The MTU value may be established by certain applications to optimize performance or provide certain functionality. The MTU between two hosts on a network is negotiated between the hosts so that the lowest MTU is selected among all interconnect elements between the hosts, as well as the hosts themselves. Since the IP packet 50 is generated prior to inserting the ESVNM 66, it is important that the MTU is not exceeded when adding the additional data.

Figure 4:
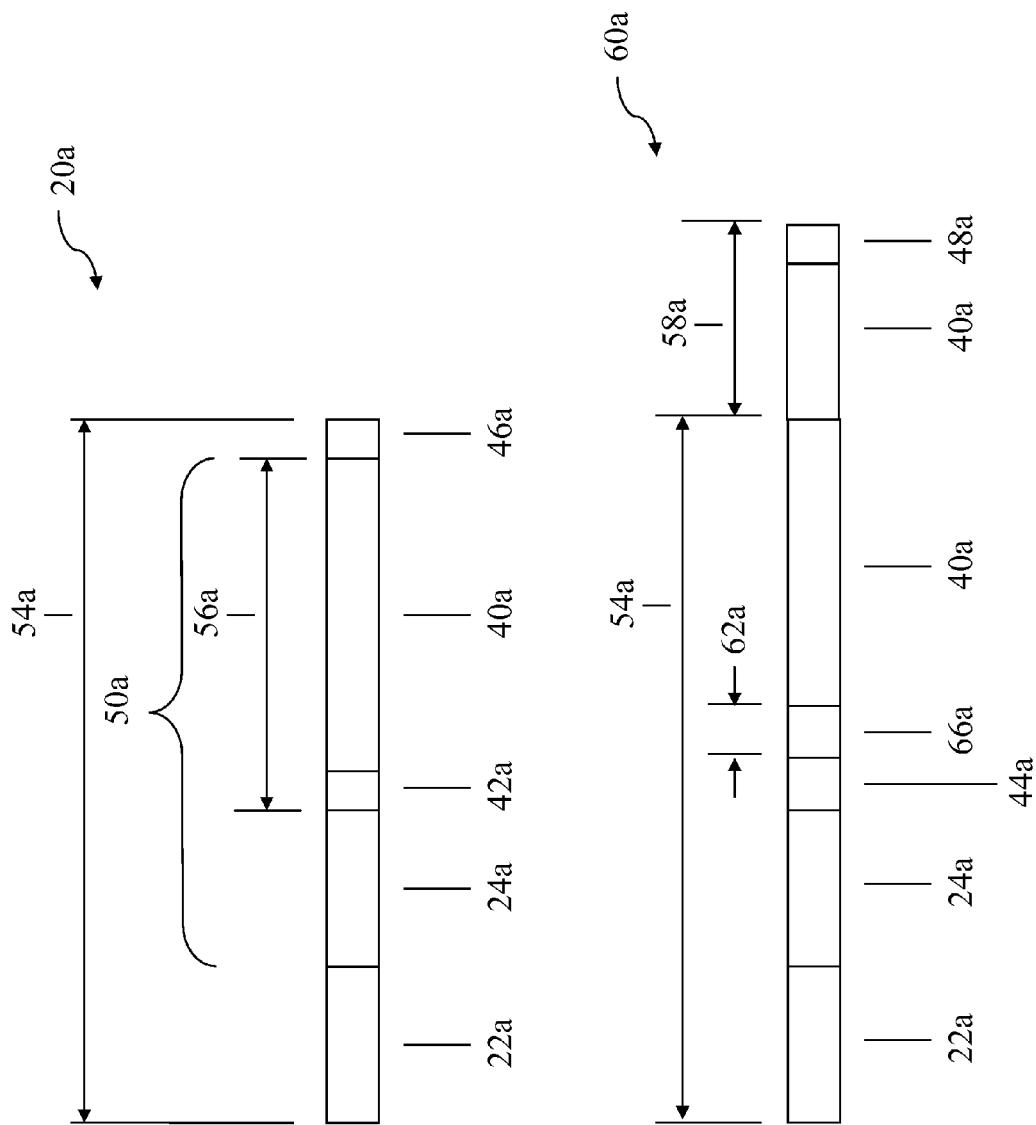
FIG. 4 is a diagram showing an instance of an IP packet encapsulated within an Ethernet packet, showing the MTU of the packet. In addition, it shows how the insertion of an SVNM to create an SVNP can exceed the MTU.

FIG. 4 illustrates Ethernet packet 20a encapsulating IP packet 50a. Ethernet packet 20a has a maximum length 54a determined by MTU 56a as well as the fixed length of Ethernet header 22a, IP header 24a, and Ethernet CRC 46a. When ESVNM message 66a is added to Ethernet packet 20a to create ESVNP 60a, the length of the packet exceeds the maximum length 54a by a length of 58a. Although ESVNP 60a consists of a properly formatted IP packet encapsulated inside a properly formatted Ethernet packet, it may have problems reaching its destination because it exceeds the MTU 56a that is required by hosts and interconnect elements within the network.

Figure 5:
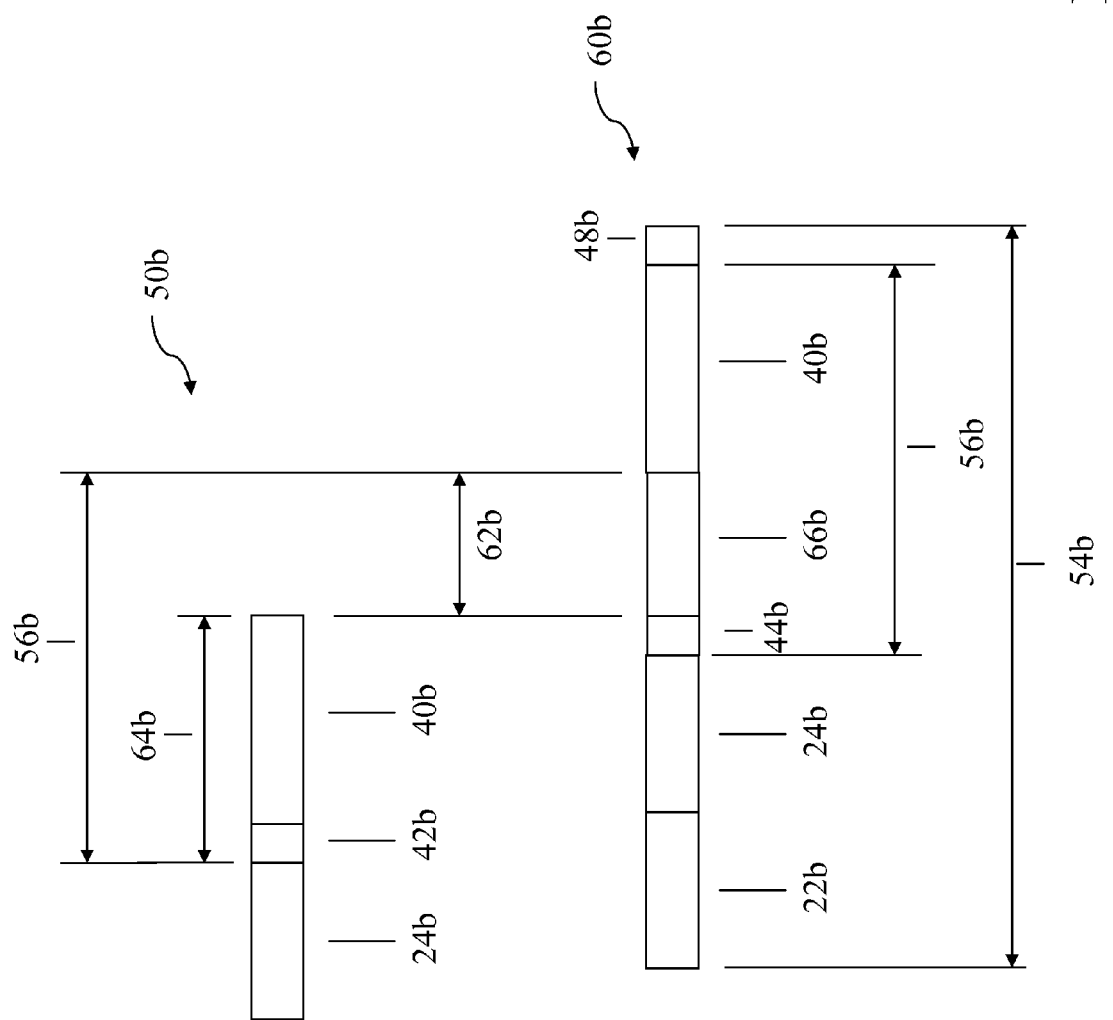
FIG. 5 is a diagram showing an instance of an IP packet, and how the MTU can be lowered to accommodate the SVNM without exceeding the original MTU.

FIG. 5 illustrates the construction of ESVNP 60b. A maximum length 62b is established for ESVNM 66b. An SVN MTU 64b is then established by reducing the value of MTU 56b by the value of ESVNM maximum length 62b. The IP layer of the OSI stack will then generate the IP packet 50b using the SVN MTU 64b, which will limit the size of the IP packet 50b before the ESVNM 66b is added to it. As a result, ESVNM 66b can be added to IP packet 50b without exceeding MTU 56b.

After the ESVNM 66b is added to IP packet 50b, Ethernet header 22b, and Ethernet CRC 48b are added to the packet by the Ethernet data link layer, resulting in ESVNP 60b. Since MTU 56b is not exceeded, the maximum length 54b of ESVNP 60b will not be exceeded and packet fragmentation will not occur.

If the total amount of data that needs to be transmitted exceeds the SVN MTU 64, then the IP layer will split the data to be transmitted into two or more fragmented IP packets. The IP layer of the OSI stack will take the remaining data that is to be sent and will form additional IP packets 50 that will be no larger than the MTU 56 until all of the data has been sent. Each fragmented IP packet 50 will normally be encapsulated as a standard Ethernet packet 20, with an IP packet payload 52 consisting of the remaining transport payload 40, as well as a TCP or UDP checksum within transport layer header 42.

Figure 6:
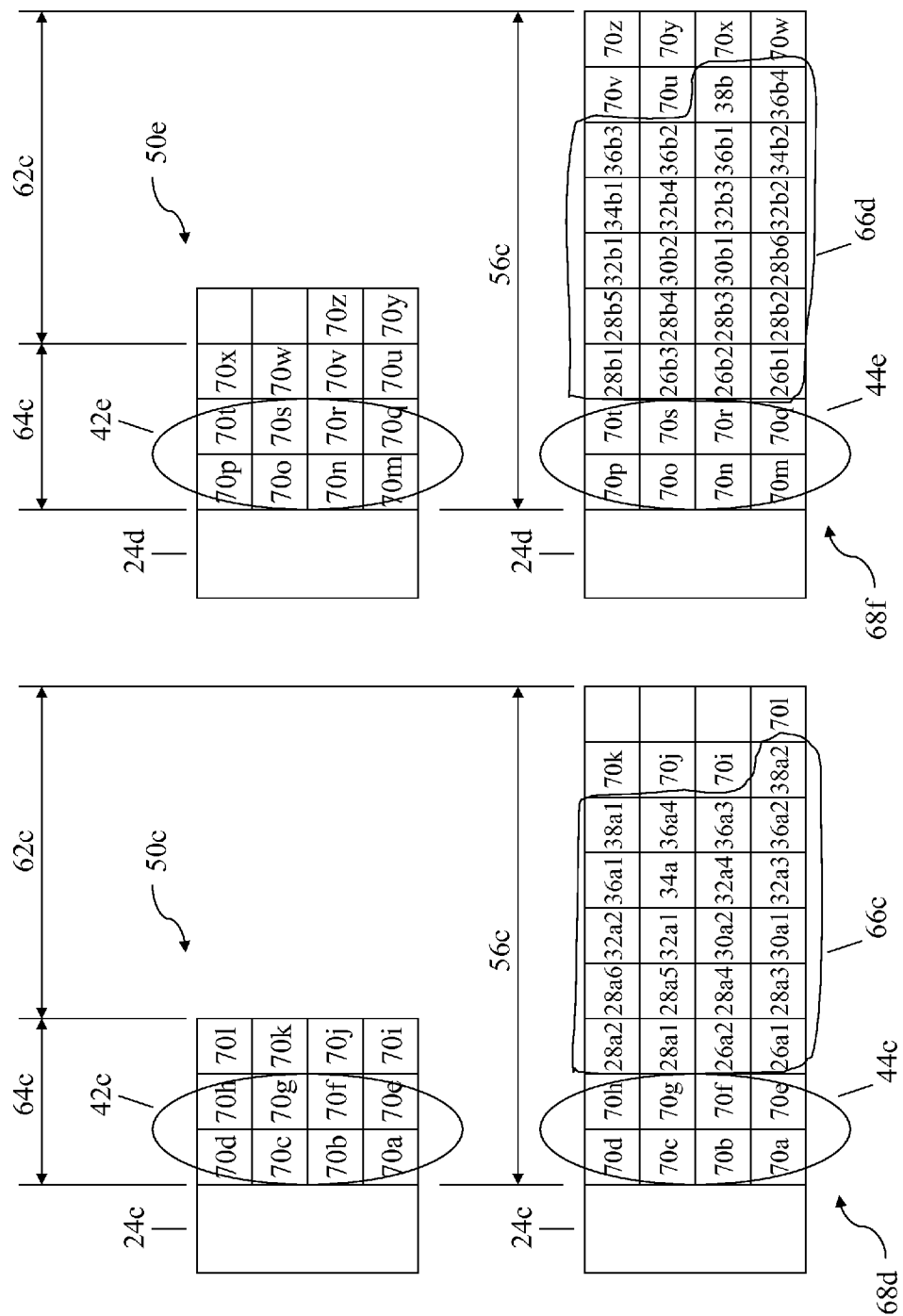
FIG. 6 is a diagram showing how IP data is fragmented into two packets, and how an SVNM is added to each of those packets.

FIG. 6 illustrates fragmented IP packet 50c with IP header 24c, and IP packet 50d with IP header 24d. For illustration, the IP payload is shown organized in groups of four bits wide, although in any given implementation, the width of these groups will depend on the word width utilized. The IP payload of IP packet 50c is shown as individual bits 70, with bit 70a being the first bit to be transferred and bit 70z being the last bit to be transferred.

The MTU of the system is established to be 56c, and the fixed length SVNM 32a is set to a fixed value of 4 bits 32a1, 32a2, 32a3, and 32a4 within ESVNM 66c and four bits 32b1, 32b2, 32b3, and 32b4 within ESVNM 66d. The maximum number of bits that comprise the ESVNM 66c is established to be 24 bits, which is ESVNM maximum length 62c. Accordingly, the SVN MTU is set to 64c in order to accommodate the insertion of the ESVNM 66c without exceeding the MTU of 56c.

A security method is utilized to determine that, for the first ISVNP 68d to be sent, the variable length offset 28a will be six bits 28a1, 28a2, 28a3, 28a4, 28a5, and 28a6. The bit-based offsets 26a and 30a will both be two bits 26a1, 26a2, and 30a1, 30a2, respectively. The bit-based offset 34a will be one bit, the bit-based offset 38a will be two bits 38a1 and 38a2. The variable length offset 36a will be four bits 36a1, 36a2, 36a3, and 36a4. The ESVNM 66c is inserted into IP packet 50c following IP header 24c and modified transport layer header 44c. After the ESVNM 66c is inserted, the IP payload begins at 70a and the payload continues up to 70l to form the first ISVNP 68d. The ISVNP 68d does not exceed the MTU 56c and should be accepted by the receiving host, as well as all intermediate interconnect elements.

A security method is utilized to determine that, for the second ISVNP 68f to be sent, the variable length offset 28b will be six bits 28b1, 28b2, 28b3, 28b4, 28b5, and 28b6. The bit-based offset 26b will be three bits 26b1, 26b2, and 26b3. The bit-based offsets 30b and 34b will both be two bits 30b1, 30b2 and 34b1, 34b2, respectively. The bit-based offset 38b will be one bit, and the variable length offset 36b will be four bits 36b1, 36b2, 36b3, and 36b4. The ESVNM 66d is inserted into IP packet 50e following IP header 24d and modified transport layer header 44e. After the ESVNM 66d is inserted, the IP payload continues at 70m and the payload continues up to 70z to form the last ISVNP 68f. The ISVNP 68f does not exceed the MTU 56c and should be accepted by the receiving host, as well as all intermediate interconnect elements.

If IP packets 50c and 50e are encapsulating another protocol, such as TCP or UDP, then the header of that protocol should be preserved to be compatible with certain interconnect elements that may use some of the header information for functions such as statistical reporting or error checking. In addition, protocols such as TCP and UDP have a data checksum located within their header, which needs to be modified after the ESVNM 66 is inserted into each packet, so that intermediate interconnect elements and the receiving host will not reject the packet. For illustration, individual bits 70a, 70b, 70c, 70d, 70e, 70f, 70g, and 70h comprise header 42c for IP packet 50c, and individual bits 70m, 70n, 70o, 70p, 70q, 70r, 70s, and 70t comprise header 42e for IP packet 50e. Transport layer header 42c is modified with a new checksum to become modified transport layer header 44c consisting of bits 70a, 70b, 70c, 70d, 70e, 70f, 70g, and 70h within ISVNP 68d, and the checksum within transport layer header 42e is modified and inserted into modified transport layer header 44e consisting of bits 70m, 70n, 70o, 70p, 70q, 70r, 70s, and 70t.

Figure 7:
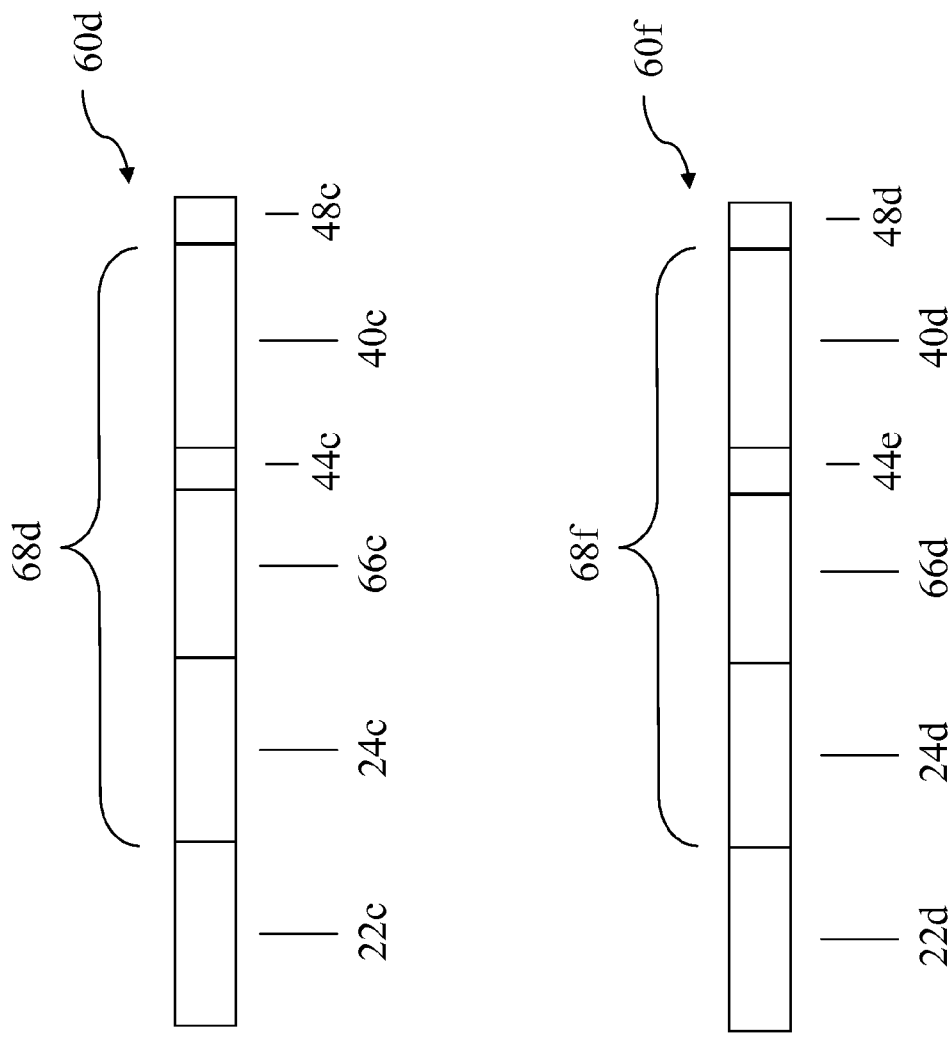
FIG. 7 is a diagram showing how two SVNPs are created from the two packets depicted in FIG. 6.

FIG. 7 illustrates the attachment of the Ethernet header 22c and Ethernet CRC 48c to ISVNP 68d, resulting in ESVNP 60d. In the same manner, Ethernet header 22d and Ethernet CRC 48d are added to ISVNP 68f, resulting in ESVNP 60f.

Intermediate devices such as hosts 12 or interconnect elements 14 that are able to observe the ESVNP 68d or ESVNP 68f will process these packets as normal Ethernet packets encapsulating normal IP packets. If the intermediate devices analyze the modified transport layer header 44c within ESVNP 60d, or 44e within ESVNP 60f, they will obtain the proper transport layer protocol information and checksum value. This will assure compatibility with interconnect elements 14 that analyze data in the transport layer protocol headers.

SVN hosts may use various mechanisms to encode SVNM and generate ESVNM that may be transmitted securely across a public network. These mechanisms will enable SVN hosts to coordinate the encoding/decoding mechanisms. Following are example methods for implementing of SVNM/ESVNM.

Figure 8:
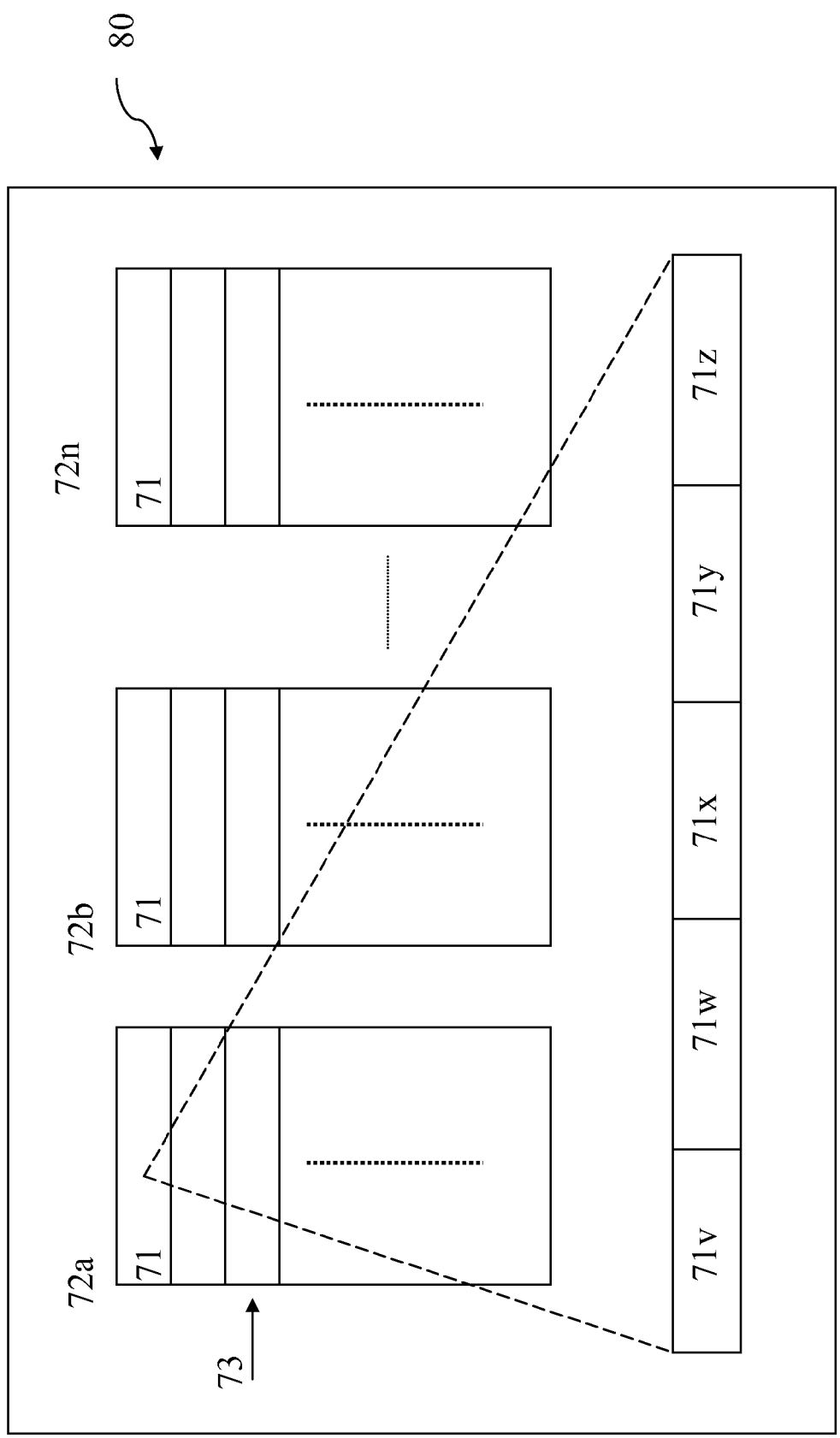
FIG. 8 is a table containing information for encoding SVNM to create ESVNM.

FIG. 8 depicts a static table-based method for encoding SVNM to create ESVNM. In this method, each SVN host 12 will incorporate a SVNM generation table 80. Within this, there may be one or several SVNM information tables 72. These tables will have multiple entries of SVNM information entry 71. Each entry 71 will contain various fields. In one embodiment, entry 71 has five fields shown as 71v, 71w, 71x, 71y, and 71z in FIG. 8. In this embodiment, field 71v represents the number of packets that an SVNM will be split across and will vary from 1 to p, where p will be maximum number set by the SVN master. Field 71w represents the number of fragments that SVNM will be split into. Field 71x represents the starting position of the first SVNM fragment and the sequence for next fragments within a packet, while field 71y represents the encoding key. Field 71z represents the key for next message. At any given instance, an entry 71 will be selected based on SVNM information pointer 73.

During the SVN setup process, the SVN master will setup the SVNM generation table 80 with one or more information tables 72. When the SVN host needs to generate an SVNM for a packet, it will access the generation table 80 by using pointer 73 and entry 71 to generate ESVNM packets. For the next access, pointer 73 will be generated based on field 71z. It should be noted that field 71z may direct the SVN host to access the same entry 71 or a different one.

Figure 9:
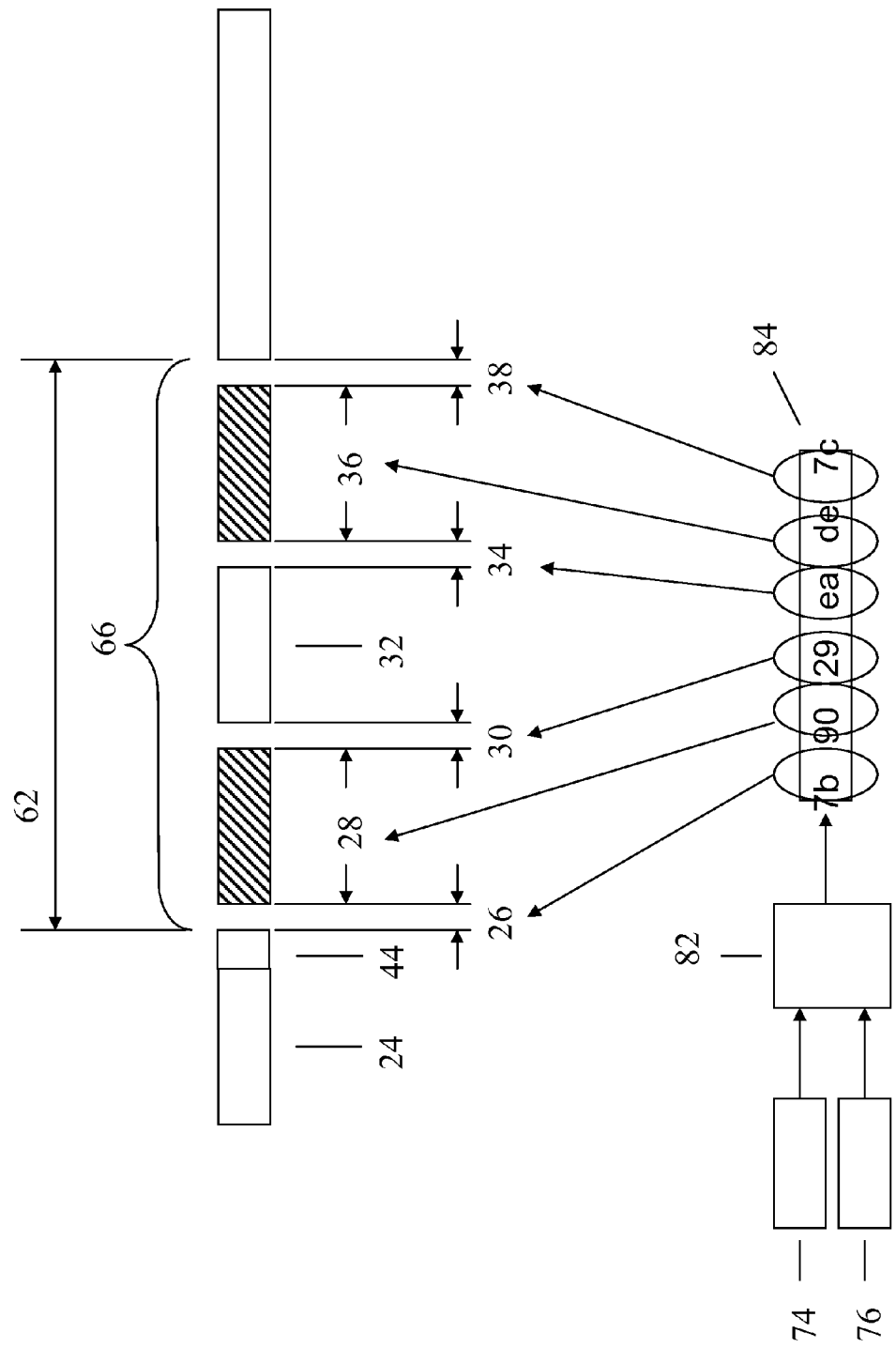
FIG. 9 is a diagram showing how a parameter-based method is utilized to provide the starting and ending positions of the SVNM to create an encoded SVNM.

Turning now to FIG. 9, a parameter-based method is provided for encoding an SVNM to create an ESVNM. The source MAC address 74 of the sending host 12 is passed along with a base seed 76 to hash generator 82. The output of hash generator 82 will be a unique parameter-based hash 84 of base seed 76 and source MAC address 74. The parameter-based hash 84 will be a number that is used to determine each of the bit based offsets 26, 30, 34, and 38 as well as the variable length offsets 28 and 36. In the example shown, the parameter-based hash 84 consists of a 6-byte number in hexadecimal format. The first byte 7b of parameter-based hash 84 could, for example, determine the number of bits will make up the selected bit-based offset 26. In a similar manner, the second byte 90 of unique hash 84 could determine the number of bits used for variable length offset 28. The third byte 29 could determine the bit-based offset 30; the fourth byte ea for bit-based offset 34. Similarly, variable length offset 36 could be determined by the fifth byte de; and the sixth byte 7c could determine the bit-based offset 38. The contents of the variable length offsets 36 and 38 are filled with random data, which are generated by a random number generator. It is important during the construction of the ESVNM 66 that the ESVNM maximum length 62 is not exceeded, so that packet fragmentation will not occur.

The sending and receiving hosts 12 will each receive the base seed 76 from the SVN master. The source MAC address 74 will be obtained by the receiving host 12 from the Ethernet header 22 of the received packet. Therefore, receiving host 12 will be able to use a local hash generator 82 to recreate the parameter-based hash 84 to obtain the bit offsets 26, 30, 34, and 38 as well as the variable length offsets 28 and 36. Once these are known, the full ESVNM can be extracted from the ISVNP 68 to obtain both the original IP packet 50 and the SVNM.

Figure 10:
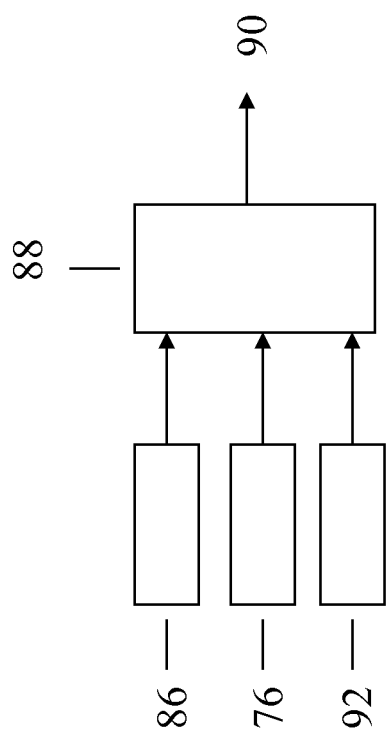
FIG. 10 is a diagram showing how a time-based method is utilized to provide the starting and ending positions of the SVNM to create an encoded SVNM.

FIG. 10 illustrates a time-based method for encoding an SVNM to create an ESVNM. Each SVN host 12 that is a member of the same SVN will have a local clock 92 that will be synchronized with the SVN master clock. This synchronization will happen when an SVN host 12 first joins an SVN, and periodically as needed to maintain the synchronization of all clocks. The SVN master will provide each SVN host with a base seed 76 as well as a time interval 86 at which the SVN host 12 must increment the base seed 76 to generate the next time-based hash 90 from hash generator 88. The time-based hash 90 will be based on the base seed 76 selected during time interval 86. The time-based hash 90 will modify the bit-based offsets 26, 30, 34, and 38 and variable offsets 38 and 36 in the same manner as the parameter-based hash 84 in the example of FIG. 9.

The receiving host 12 will have a local clock 92 that is synchronized with the transmitting host 12, and will have the same base seed 76. Using the base seed 76 and the time interval 86, the receiving host is able to recreate the time-based hash 90 to obtain the bit offsets 26, 30, 34, and 38 as well as the variable length offsets 28 and 36. Once these are known, the full ESVNM 66 can be extracted from the ISVNP 68 to obtain both the original IP packet 50 and the SVNM. If the ESVNM 66 is not extracted properly, as indicated by an improperly formatted SVNM or incorrect checksum within the SVNM, the receiving SVN host 12 can attempt to use the previous or next unique hash 90 to extract the ESVNM from the ISVNP 68.

Figure 11:
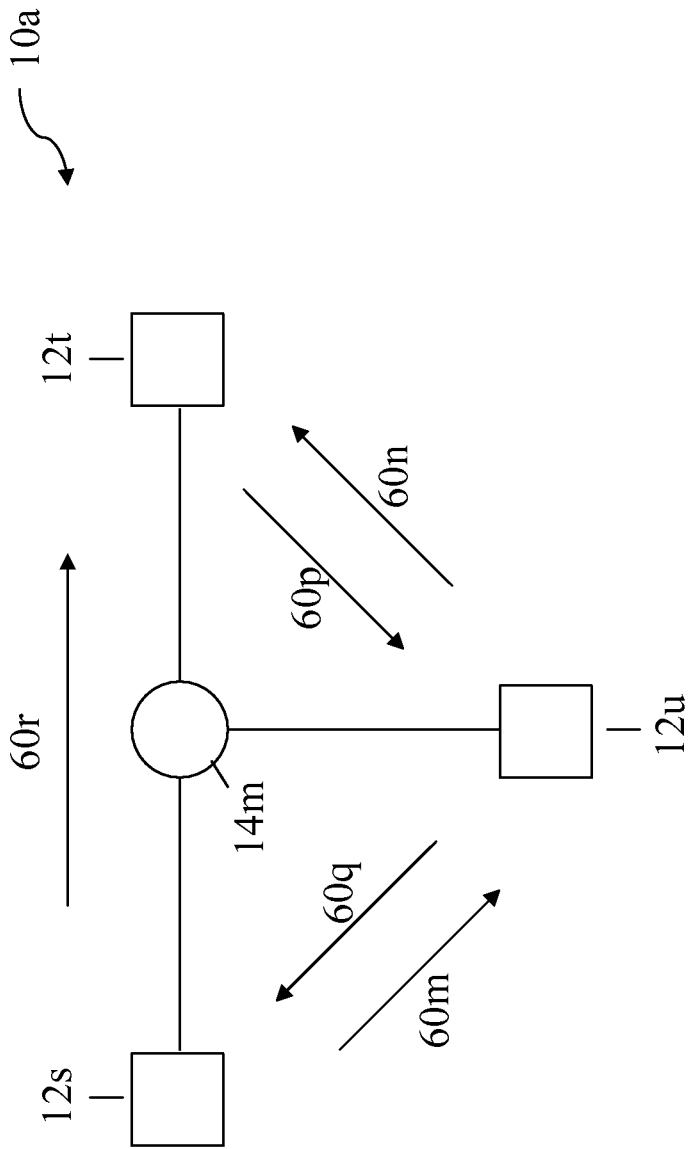
FIG. 11 is a diagram showing 3 hosts connected to an interconnect, where 2 of the hosts wish to communicate by creating SVNPs that are encoded using a counter-based method.

Turning now to FIG. 11, an example of a counter-based method for encoding an SVNM to create an ESVNM is illustrated. Communication system 10*a* consists of hosts 12*s*, 12*t*, and 12*u* all connected to interconnect element 14*m*. SVN host 12*s* wishes to initiate communication with target SVN host 12*t*.

Figure 12:
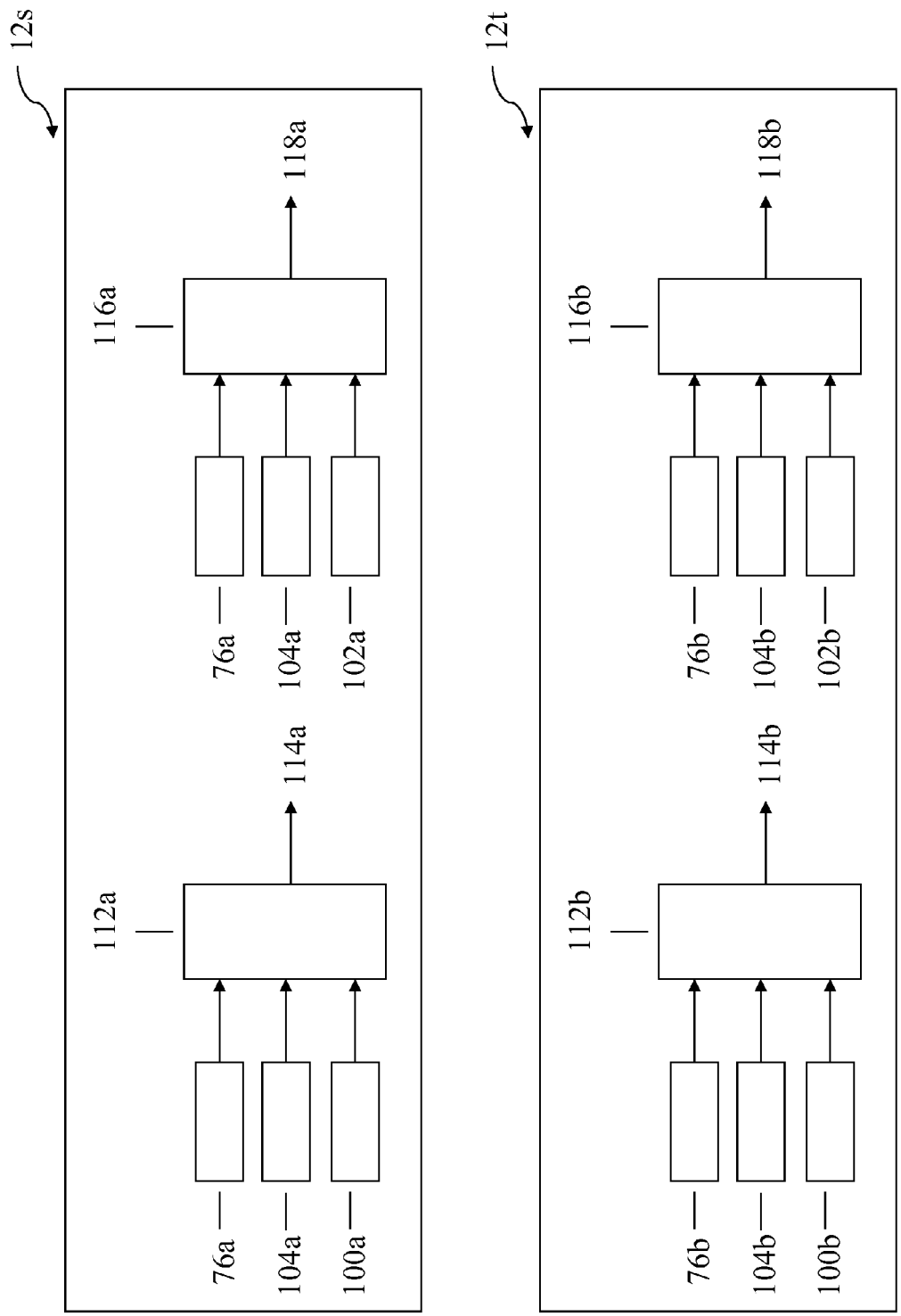
FIG. 12 is a diagram showing how a counter-based method is utilized to provide the starting and ending positions of the SVNM to create an encoded SVNM.

FIG. 12 illustrates the details of SVN hosts 12*s* and 12*t*. Host 12*s* first establishes an SVN transmit counter 100*a* and an SVN receive counter 102*a* to keep track of, respectively, the number of packets transmitted to and received from SVN host 12*t*. SVN host 12*s* sends a request to SVN master host 12*u* to communicate with the target SVN host 12*t*. This request takes the form of an SVNM 32 embedded within an ESVNP 60*m*, which passes through interconnect element 14*m* to reach SVN master host 12*u*.

After receiving ESVNP 60*m*, the SVN master 12*u* will issue a request ESVNP 60*n* to the target SVN host 12*t* to establish and initialize an SVN transmit counter 100*b* and an SVN receive counter 102*b* to keep track of, respectively, the number of packets transmitted to and received from SVN host 12*s*. Transmit counter 100*b* and receive counter 102*b* are shown within SVN host 12*t* in FIG. 12. Additionally, the SVNM within ESVNP 60*n* provides base seed 76*a* and counter rollover value 104*a* to transmit counter-based hash generator 112*b* and receive counter-based hash generator 116*b* within SVN host 12*t*. The SVNM 32 within ESVNP 60*n* also requests SVN host 12*t* to wait for SVN host 12*s* to send an ESVNP 60 with instructions to begin counting packets with transmit counter 100*b* and receive counter 102*b*. SVN host 12*t* will then send an ESVNP 60*p* to SVN host 12*u*, acknowledging that it is ready to receive ESVNPs from SVN host 12*s*.

After receiving ESVNP 60*p*, the SVN master 12*u* will issue ESVNP 60*q* to SVN host 12*s*, providing SVN host 12*s* with base seed 76*a* and counter rollover value 104*a* to transmit counter-based hash generator 112*a* and receive counter-based hash generator 116*a* within SVN host 12*s*. The ESVNP 60*q* will also contain a request to SVN host 12*s* to begin sending SVNPs to SVN host 12*t*, and to begin incrementing the SVN transmit counter 100*a* and the SVN receive counter 102*a*, respectively, as packets are transmitted to SVN host 12*t* and received from SVN host 12*t*. When the SVN transmit counter 100*a* reaches counter rollover value 104*a*, transmit counter 100*a* resets and the next transmit hash 114*a* is generated. When the SVN receive counter 102*a* reaches counter rollover value 104*a*, receive counter 102*a* resets, and the next receive hash 118*a* is generated.

The transmit hash 114 and receive hash 118 both initialize to the value of base seed 76. Each time the counter rollover value 104 is reached, the transmit hash generator 112, or the receive hash generator 116 will change the base seed 76 in such a way that both the transmit hash 114 within the transmitting host and the receive hash 118 within the receiving host will both use the same base seed 76 when transmit counter 100 in the transmitting host and receive counter 102 in the receiving host are equal.

After SVN host 12*s* receives ESVNP 60*q*, and establishes transmit counter 100*a* and receive counter 102*a*, it sends the first ESVNP 60*r* to SVN host 12*t*, incrementing transmit counter 100*a* and using transmit hash 114*a* to encode SVNM 32 within ESVNP 60*r*. When SVN host 12*t* receives ESVNP 60*r*, receive counter 102*b* will be equal to transmit counter 100*a* within SVN host 12*s*. Base seed 76*a* and counter reset value 104*a* will also be the same, and so receive hash generator 116*b* will generate receive hash 118*b* that will be equal to transmit hash 114*a* within SVN host 12*s*. Using the receive hash 118*b*, SVN host 12*t* is able to obtain the bit offsets 26, 30, 34, and 38 as well as the variable length offsets 28 and 36 from ESVNP 60*r*. Once these are known, the full ESVNM can be extracted from the ISVNP 68 to obtain both the original IP packet 50 and the SVNM.

Figure 13:
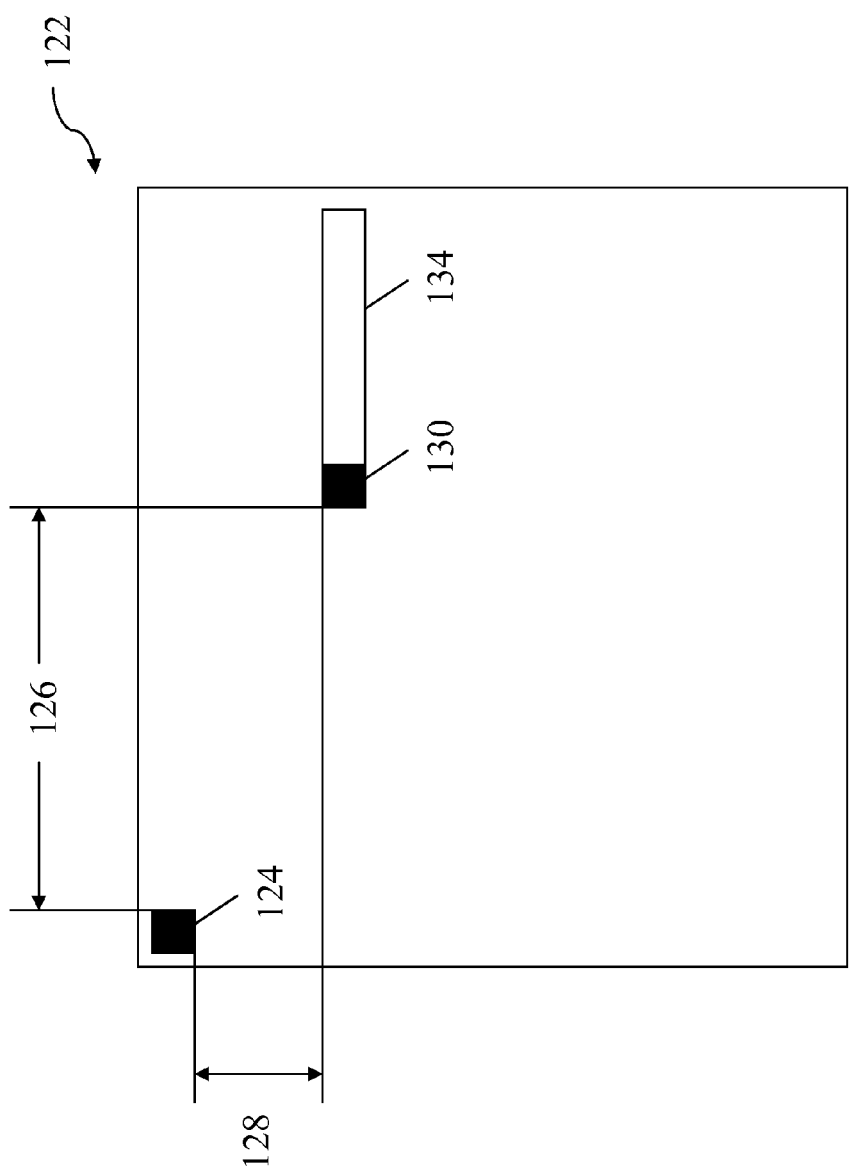
FIG. 13 is a diagram Hash based method in SVN.

Turning now to FIG. 13, a static hash table-based method is provided for encoding an SVNM to create an ESVNM. A hash table 122 will be located within each SVN host 12, such that each SVN host 12 within the same SVN will have the same hash table 122. In the example shown in FIG. 13, hash table 122 takes the form of a graphical image, with the contents of the hash table being the encoded graphical information that is unique to the graphical image and the image format.

A hash table origin 124 marks the beginning of the graphical information contained in hash table 122. A hash table horizontal offset 126 marks the horizontal distance between the end of the hash table origin 124 and the beginning of the hash table pointer 130. A hash table vertical offset 128 marks the vertical distance between the end of the hash table origin 124 and the beginning of the hash table pointer 130. The hash table horizontal offset 126 and vertical offset 128 can be in units of pixels, characters or binary data. The values of the hash table horizontal offset 126 and vertical offset 128 will be static, and will be provided during the initialization of the SVN. All SVN hosts within the same SVN will have the same static horizontal offset 126 and vertical offset 128.

The hash table pointer 130 is initialized to be located at the hash table origin 124, and is used as the beginning of hash 134 that is used to determine the bit offsets 26, 30, 34, and 38 as well as the variable length offsets 28 and 36 within the ESVNM.

The SVN master host may periodically send a message in the form of an SVNP to all SVN hosts 12 within the same SVN, requesting them to select the next hash table pointer 130 using the hash table horizontal offset 126 and vertical offset 128. This will result in a change of the hash table pointer 130. In the case that the horizontal offset 126 or vertical offset 128 exceed the boundaries of the hash table 122, the offset that exceeded the boundary can wrap around to the other side of the hash table 122. The change in the hash table pointer 130 will result in a new hash 134 used to determine the bit offsets 26, 30, 34, and 38 as well as the variable length offsets 28 and 36 within the ESVNM 66. Additionally, the SVN master host may periodically distribute a new hash table horizontal offset 126 or vertical offset 128 to all SVN hosts 12 within the same SVN.

Figure 14:
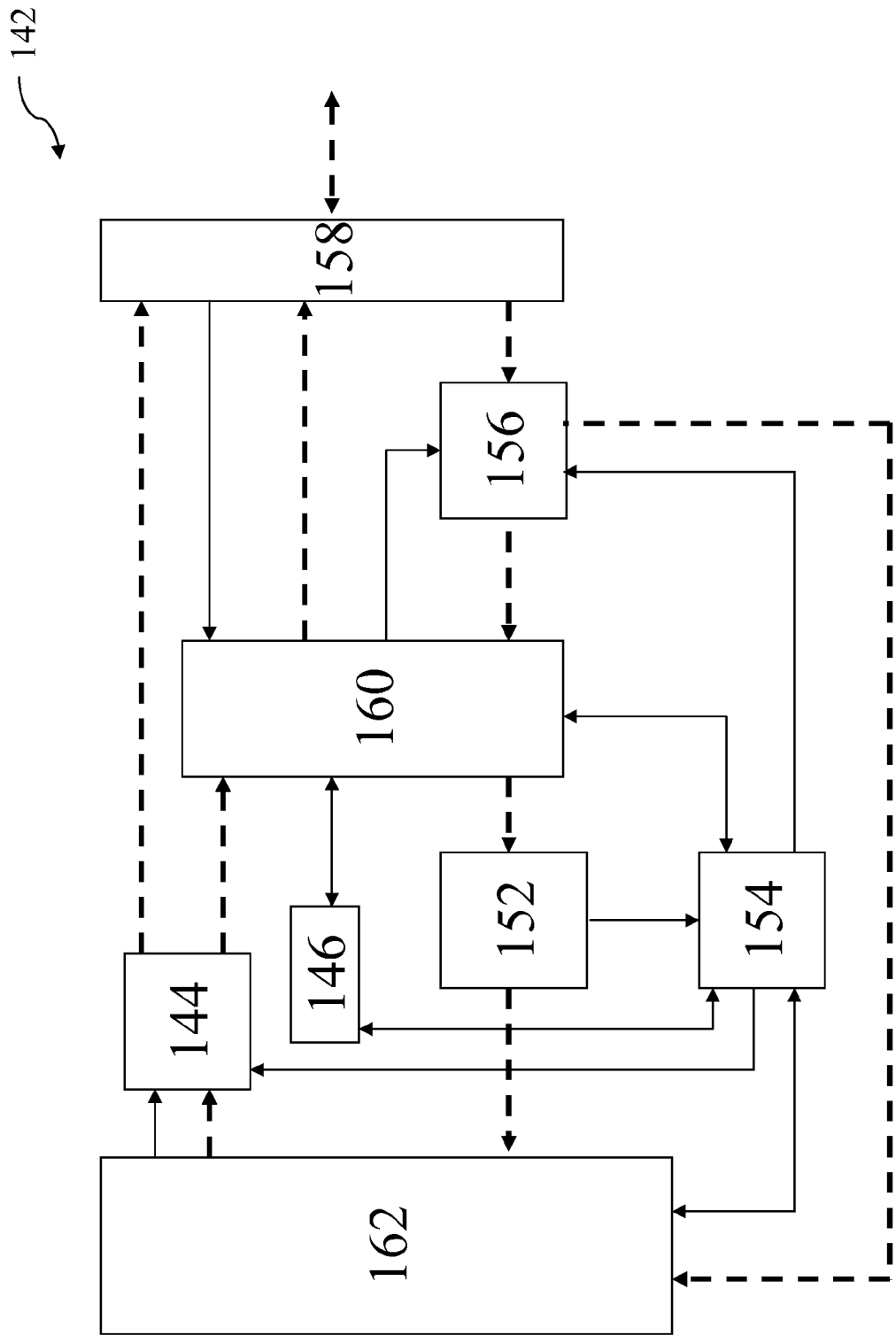
FIG. 14 is a diagram of sample SVN implementation in SVN host.

Turning now to FIG. 14, a sample embodiment of SVN logic flow is shown. Each SVN host 12, including the SVN master host, will contain software and/or hardware to provide the ability to send and receive ESVNPs. This software and/or hardware will be referred to as an SVN host module (SHM) 142 as shown in FIG. 14. The SHM 142 provides an interface between host applications 162 running on the SVN host 12 and the Network Adapter 158. Dashed arrows show data paths, while solid arrows show control paths.

The SHM 142 can optionally allow host applications 162 running on the SVN host 12 to communicate with non-SVN hosts using standard Ethernet or TCP/IP packets. To allow this functionality, SHM control module 154 controls transmit multiplexer 144 to allow the host application 162 to send standard packets such as TCP/IP directly out of network adapter 158, bypassing the encode/decode module 160.

When SVN packets are to be sent from the host application 162, SHM control module 154 uses transmit multiplexer 144 to direct outbound data to the encode/decode module 160, which will encode the outbound data into an ESVNP 60 before going to network adapter 158. As previously described, various methods can be used to encode the ESVNP 60. Encode/decode module 160 is controlled by SHM control module 154 to select the encoding and decoding method to be used. The encode/decode module 160 may obtain the source MAC address 74 from the network adapter 158 to be used for encoding, if necessary. The encode/decode module 160 and SHM control module 154 may also interface with external device 146, which may consist of a Smart Card, USB Key Card, biometric, or similar device that can provide user-specific information to be used for parameter-based encoding, or during authentication.

Packets received by SVN network adapter 158 are first processed by receive filter 156, which determines if incoming packets are ESVNPs 60, or standard packets such as TCP/IP. Receive filter 156 may use information provided by the encode/decode module 160 and SHM control module 154 to determine the type of packet. Incoming packets that are identified by receive filter 156 to be non-ESVNP packets are sent directly to host application 162 and are unmodified. If the incoming packet is identified as an ESVNP 60, then it is passed on to the encode/decode module 160. The ESVNP 60 is decoded by encode/decode module 160 using the encode/decode method chosen by SHM control module 154. Decoding errors, warnings, messages and statistics may be passed from encode/decode module 160 to SHM control module 154 as needed.

Once the ESVNP 60 has been decoded by encode/decode module 160, it passes to message extraction module 152, which extracts the SVNM 32 from the decoded ESVNP 60 and passes it to SHM control module 154. The SVNM 32 contains information to be exchanged between an SVN hosts and an SVN masters. The message extraction module then removes the SVNM 32 from the packet before passing it to the host application 162 as a standard packet such as TCP/IP.

It should be noted that FIG. 14 is only one example of the many possible implementations of SVN.

Various modification and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed:

1. A method of secure communication between two or more hosts using a public network, such as the Internet, comprising:
    setting up one or more secure virtual networks (SVN) to enable two or more hosts to communicate over said public network;
    assigning an SVN identifier that is independent of network transmission and routing protocols for each host in the SVN environment, wherein said SVN identifier identifies said hosts for the SVN environment;
    designating at least one of said hosts as a master node to control operation of the SVN environment;
    communicating SVN setup and control information along with information packets communicated over the network;
    sending a request for secure communications from one host to said master node;
    granting or denying said communication request based on one or more SVN parameters stored on said master node;
    establishing a secure communication session among two or more hosts;
    securing said information packets by inserting a secure virtual network message (SVNM) into the payload portion of a packet;
    communicating information packets over the secure communication session; and
    terminating the SVN session by said master node.

2. The method of claim 1, wherein more than one master node is designated.

3. The method of claim 1, wherein said SVN parameters comprise a table which designates which hosts are permitted to communicate.

4. The method of claim 1, wherein said SVN parameters comprise time or geographic locations of said hosts.

5. The method of claim 1, wherein said communicating step includes sending an SVN packet comprising one or more protocols and an SVN message.

6. The method of claim 5, wherein said SVN message includes SVN identifiers for sending and receiving hosts, and wherein the said SVN identifiers are independent of network protocol addresses.

7. The method of claim 6, wherein the starting location of said SVN message is offset from the beginning of the data portion of said protocol.

8. The method of claim 1, wherein the SVN identifier is used as part of a security protocol.

9. A secure communication host with a security mechanism independent of the network operations, implemented between one or more applications running on said secure communication host generating packets of information in accordance to industry standard protocols such as the Internet Protocol (IP) and a network adaptor configured to connect to one or more networks, comprising:
    an encoder to add security information into said packets of information generated by said application to be transmitted by said network adaptor via said connected networks;

a decoder to extract security information from packets of information received by said network adaptor from connected networks;

a message extractor to extract a message;

security information comprising at least one secure virtual network (SVN) identifier that is independent of network operations and routing; and wherein said host is configured to control and regulate the generation of said security information, operation of said encoder, and operation of said decoder.

10. The secure communication host of claim 9, including mechanisms to piggy-back said security information on said packets of information.

11. The secure communication host of claim 9, including mechanisms for it to be part of a virtual security network comprising of two or more said secure communication host.

12. The secure communication host of claim 9, including an encoder that ensures compatibility with standard protocols.

13. The secure communication host of claim 12, further comprising a mechanism to split said packet into two or more packets to ensure compatibility with network transmission and routing requirements.

14. The secure communication host of claim 9, further comprising a transmit multiplexer that enables said packets from said applications to selectively bypass security.

15. The secure communication host of claim 9, further comprising a message extractor that removes security information and delivers said packets of information to said applications.

* * * * *